(12) United States Patent
Bailey et al.

(10) Patent No.: US 11,803,535 B2
(45) Date of Patent: Oct. 31, 2023

(54) SYSTEMS, METHODS, AND APPARATUSES FOR SIMULTANEOUSLY RUNNING PARALLEL DATABASES

(71) Applicant: CDK GLOBAL, LLC, Hoffman Estates, IL (US)

(72) Inventors: Bruce Bailey, Portland, OR (US); Mark Helzer, Portland, OR (US)

(73) Assignee: CDK GLOBAL, LLC, Hoffman Estates, IL (US)

( * ) Notice: Subject to any disclaimer, the term of this patent is extended or adjusted under 35 U.S.C. 154(b) by 28 days.

(21) Appl. No.: 17/328,880

(22) Filed: May 24, 2021

(65) Prior Publication Data

US 2022/0374411 A1    Nov. 24, 2022

(51) Int. Cl.
*G06F 15/16* (2006.01)
*G06F 16/23* (2019.01)
*G06F 16/2453* (2019.01)

(52) U.S. Cl.
CPC .... *G06F 16/2365* (2019.01); *G06F 16/24532* (2019.01)

(58) Field of Classification Search
None
See application file for complete search history.

(56) References Cited

U.S. PATENT DOCUMENTS

| | | |
|---|---|---|
| 3,792,445 A | 2/1974 | Bucks et al. |
| 4,258,421 A | 3/1981 | Juhasz et al. |
| 4,992,940 A | 2/1991 | Dworkin |
| 5,003,476 A | 3/1991 | Abe |
| 5,034,889 A | 7/1991 | Abe |
| 5,058,044 A | 10/1991 | Stewart et al. |
| 5,421,015 A | 5/1995 | Khoyi et al. |
| 5,442,553 A | 8/1995 | Parrillo |
| 5,452,446 A | 9/1995 | Johnson |
| 5,521,815 A | 5/1996 | Rose, Jr. |
| 5,649,186 A | 7/1997 | Ferguson |
| 5,694,595 A | 12/1997 | Jacobs et al. |
| 5,729,452 A | 3/1998 | Smith et al. |
| 5,764,943 A | 6/1998 | Wechsler |
| 5,787,177 A | 7/1998 | Leppek |
| 5,790,785 A | 8/1998 | Klug et al. |
| 5,835,712 A | 11/1998 | Dufresne |

(Continued)

FOREIGN PATENT DOCUMENTS

| | | |
|---|---|---|
| CA | 2494350 | 5/2004 |
| EP | 0461888 | 3/1995 |
| WO | 2007002759 | 1/2007 |

OTHER PUBLICATIONS

U.S. Appl. No. 15/478,042, Non-Final Office Action, dated Nov. 19, 2021, 45 pages.

(Continued)

*Primary Examiner* — Alex Gofman
(74) *Attorney, Agent, or Firm* — Stoel Rives LLP

(57) ABSTRACT

Embodiments herein relate to replacing a legacy Pick environment with a modern microservice architecture. A legacy database and a modern database may be operated in parallel for data validation. During the validation process, the legacy database may be used as the master copy of the data. After verifying that the modern database satisfies the data needs of a system, the system can switch to using the new modern database as the master copy.

20 Claims, 4 Drawing Sheets

(56) References Cited

U.S. PATENT DOCUMENTS

| | | |
|---|---|---|
| 5,845,299 A | 12/1998 | Arora et al. |
| 5,862,346 A | 1/1999 | Kley et al. |
| 5,911,145 A | 6/1999 | Arora et al. |
| 5,956,720 A | 9/1999 | Fernandez et al. |
| 5,974,149 A | 10/1999 | Leppek |
| 5,974,418 A | 10/1999 | Blinn et al. |
| 5,974,428 A | 10/1999 | Gerard et al. |
| 5,978,776 A | 11/1999 | Seretti et al. |
| 5,987,506 A | 11/1999 | Carter et al. |
| 6,003,635 A | 12/1999 | Bantz et al. |
| 6,006,201 A | 12/1999 | Berent et al. |
| 6,009,410 A | 12/1999 | Lemole et al. |
| 6,018,748 A | 1/2000 | Smith |
| 6,021,416 A | 2/2000 | Dauerer et al. |
| 6,021,426 A | 2/2000 | Douglis et al. |
| 6,026,433 A | 2/2000 | D'Arlach et al. |
| 6,041,310 A | 3/2000 | Green et al. |
| 6,041,344 A | 3/2000 | Bodamer et al. |
| 6,055,541 A | 4/2000 | Solecki et al. |
| 6,061,698 A | 5/2000 | Chadha et al. |
| 6,067,559 A | 5/2000 | Allard et al. |
| 6,070,164 A | 5/2000 | Vagnozzi |
| 6,134,532 A | 10/2000 | Lazarus et al. |
| 6,151,609 A | 11/2000 | Truong |
| 6,178,432 B1 | 1/2001 | Cook et al. |
| 6,181,994 B1 | 1/2001 | Colson et al. |
| 6,185,614 B1 | 2/2001 | Cuomo et al. |
| 6,189,104 B1 | 2/2001 | Leppek |
| 6,216,129 B1 | 4/2001 | Eldering |
| 6,219,667 B1 | 4/2001 | Lu et al. |
| 6,236,994 B1 | 5/2001 | Schwartz et al. |
| 6,240,365 B1 | 5/2001 | Bunn |
| 6,263,268 B1 | 7/2001 | Nathanson |
| 6,285,932 B1 | 9/2001 | De Belledeuille et al. |
| 6,289,382 B1 | 9/2001 | Bowman-Amuah |
| 6,295,061 B1 | 9/2001 | Park et al. |
| 6,330,499 B1 | 12/2001 | Chou et al. |
| 6,343,302 B1 | 1/2002 | Graham |
| 6,353,824 B1 | 3/2002 | Boguraev et al. |
| 6,356,822 B1 | 3/2002 | Diaz et al. |
| 6,374,241 B1 | 4/2002 | Lamburt et al. |
| 6,397,226 B1 | 5/2002 | Sage |
| 6,397,336 B2 | 5/2002 | Leppek |
| 6,401,103 B1 | 6/2002 | Ho et al. |
| 6,421,733 B1 | 7/2002 | Tso et al. |
| 6,473,849 B1 | 10/2002 | Keller et al. |
| 6,496,855 B1 | 12/2002 | Hunt et al. |
| 6,505,106 B1 | 1/2003 | Lawrence et al. |
| 6,505,205 B1 | 1/2003 | Kothuri et al. |
| 6,519,617 B1 | 2/2003 | Wanderski et al. |
| 6,529,948 B1 | 3/2003 | Bowman-Amuah |
| 6,535,879 B1 | 3/2003 | Behera |
| 6,539,370 B1 | 3/2003 | Chang et al. |
| 6,546,216 B2 | 4/2003 | Mizoguchi et al. |
| 6,553,373 B2 | 4/2003 | Boguraev et al. |
| 6,556,904 B1 | 4/2003 | Larson et al. |
| 6,564,216 B2 | 5/2003 | Waters |
| 6,571,253 B1 | 5/2003 | Thompson et al. |
| 6,581,061 B2 | 6/2003 | Graham |
| 6,583,794 B1 | 6/2003 | Wattenberg |
| 6,594,664 B1 | 7/2003 | Estrada et al. |
| 6,606,525 B1 | 8/2003 | Muthuswamy et al. |
| 6,629,148 B1 | 9/2003 | Ahmed et al. |
| 6,640,244 B1 | 10/2003 | Bowman-Amuah et al. |
| 6,643,663 B1 | 11/2003 | Dabney et al. |
| 6,654,726 B1 | 11/2003 | Hanzek |
| 6,674,805 B1 * | 1/2004 | Kovacevic ......... H04N 21/4305 375/E7.278 |
| 6,678,706 B1 | 1/2004 | Fishel |
| 6,697,825 B1 | 2/2004 | Underwood et al. |
| 6,701,232 B2 | 3/2004 | Yamaki |
| 6,721,747 B2 | 4/2004 | Lipkin |
| 6,728,685 B1 | 4/2004 | Ahluwalia |
| 6,738,750 B2 | 5/2004 | Stone et al. |
| 6,744,735 B1 | 6/2004 | Nakaguro |
| 6,748,305 B1 | 6/2004 | Klausner et al. |
| 6,785,864 B1 | 8/2004 | Te et al. |
| 6,795,819 B2 | 9/2004 | Wheeler et al. |
| 6,823,258 B2 | 11/2004 | Ukai et al. |
| 6,823,359 B1 | 11/2004 | Heidingsfeld |
| 6,826,594 B1 | 11/2004 | Pettersen |
| 6,847,988 B2 | 1/2005 | Toyouchi et al. |
| 6,850,823 B2 | 2/2005 | Eun et al. |
| 6,871,216 B2 | 3/2005 | Miller et al. |
| 6,901,430 B1 | 3/2005 | Smith |
| 6,894,601 B1 | 5/2005 | Grunden et al. |
| 6,917,941 B2 | 7/2005 | Wight et al. |
| 6,922,674 B1 | 7/2005 | Nelson |
| 6,941,203 B2 | 9/2005 | Chen |
| 6,944,677 B1 | 9/2005 | Zhao |
| 6,954,731 B1 | 10/2005 | Montague et al. |
| 6,963,854 B1 | 11/2005 | Boyd et al. |
| 6,965,806 B2 | 11/2005 | Eryurek et al. |
| 6,965,968 B1 | 11/2005 | Touboul |
| 6,978,273 B1 | 12/2005 | Bonneau et al. |
| 6,981,028 B1 | 12/2005 | Rawat et al. |
| 6,990,629 B1 | 1/2006 | Heaney et al. |
| 6,993,421 B2 | 1/2006 | Pillar |
| 7,000,184 B2 | 2/2006 | Matveyenko et al. |
| 7,003,476 B1 | 2/2006 | Samra et al. |
| 7,010,495 B1 | 3/2006 | Samra et al. |
| 7,028,072 B1 | 4/2006 | Kliger et al. |
| 7,031,554 B2 | 4/2006 | Iwane |
| 7,039,704 B2 | 5/2006 | Davis et al. |
| 7,047,318 B1 | 5/2006 | Svedloff |
| 7,062,343 B2 | 6/2006 | Ogushi et al. |
| 7,062,506 B2 | 6/2006 | Taylor et al. |
| 7,072,943 B2 | 7/2006 | Landesmann |
| 7,092,803 B2 | 8/2006 | Kapolka et al. |
| 7,107,268 B1 | 9/2006 | Zawadzki et al. |
| 7,124,116 B2 | 10/2006 | Huyler |
| 7,152,207 B1 | 12/2006 | Underwood et al. |
| 7,155,491 B1 | 12/2006 | Schultz et al. |
| 7,171,418 B2 | 1/2007 | Blessin |
| 7,184,866 B2 | 2/2007 | Squires et al. |
| 7,197,764 B2 | 3/2007 | Cichowlas |
| 7,219,234 B1 | 5/2007 | Ashland et al. |
| 7,240,125 B2 | 7/2007 | Fleming |
| 7,246,263 B2 | 7/2007 | Skingle |
| 7,281,029 B2 | 10/2007 | Rawat |
| 7,287,000 B2 | 10/2007 | Boyd et al. |
| 7,322,007 B2 | 1/2008 | Schowtka et al. |
| 7,386,786 B2 | 6/2008 | Davis et al. |
| 7,401,289 B2 | 7/2008 | Lachhwani et al. |
| 7,406,429 B2 | 7/2008 | Salonen |
| 7,433,891 B2 | 10/2008 | Haber et al. |
| 7,457,693 B2 | 11/2008 | Olsen et al. |
| 7,477,968 B1 | 1/2009 | Lowrey |
| 7,480,551 B1 | 1/2009 | Lowrey et al. |
| 7,496,543 B1 | 2/2009 | Bamford et al. |
| 7,502,672 B1 | 3/2009 | Kolls |
| 7,536,641 B2 | 5/2009 | Rosenstein et al. |
| 7,548,985 B2 | 6/2009 | Guigui |
| 7,587,504 B2 | 9/2009 | Adams et al. |
| 7,590,476 B2 | 9/2009 | Shumate |
| 7,593,925 B2 | 9/2009 | Cadiz et al. |
| 7,593,999 B2 | 9/2009 | Nathanson |
| 7,613,627 B2 | 11/2009 | Doyle et al. |
| 7,620,484 B1 | 11/2009 | Chen |
| 7,624,342 B2 | 11/2009 | Matveyenko et al. |
| 7,657,594 B2 | 2/2010 | Banga et al. |
| 7,664,667 B1 | 2/2010 | Ruppelt et al. |
| 7,739,007 B2 | 6/2010 | Logsdon |
| 7,747,680 B2 | 6/2010 | Ravikumar et al. |
| 7,778,841 B1 | 8/2010 | Bayer et al. |
| 7,801,945 B1 | 9/2010 | Geddes et al. |
| 7,818,380 B2 | 10/2010 | Tamura et al. |
| 7,861,309 B2 | 12/2010 | Spearman et al. |
| 7,865,409 B1 | 1/2011 | Monaghan |
| 7,870,253 B2 | 1/2011 | Muilenburg et al. |
| 7,899,701 B1 | 3/2011 | Odom |
| 7,908,051 B2 | 3/2011 | Oesterling |
| 7,979,506 B2 | 7/2011 | Cole |
| 8,010,423 B2 | 8/2011 | Bodin et al. |

(56) References Cited

U.S. PATENT DOCUMENTS

| | | |
|---|---|---|
| 8,019,501 B2 | 9/2011 | Breed |
| 8,036,788 B2 | 10/2011 | Breed |
| 8,051,159 B2 | 11/2011 | Muilenburg et al. |
| 8,055,544 B2 | 11/2011 | Ullman et al. |
| 8,060,274 B2 | 11/2011 | Boss et al. |
| 8,095,403 B2 | 1/2012 | Price |
| 8,099,308 B2 | 1/2012 | Uyeki |
| 8,135,804 B2 | 3/2012 | Uyeki |
| 8,145,379 B2 | 3/2012 | Schwinke |
| 8,190,322 B2 | 5/2012 | Lin et al. |
| 8,209,259 B2 | 6/2012 | Graham, Jr. et al. |
| 8,212,667 B2 | 7/2012 | Petite et al. |
| 8,271,473 B2 | 9/2012 | Berg |
| 8,271,547 B2 | 9/2012 | Taylor et al. |
| 8,275,717 B2 | 9/2012 | Ullman et al. |
| 8,285,439 B2 | 10/2012 | Hodges |
| 8,296,007 B2 | 10/2012 | Swaminathan et al. |
| 8,311,905 B1 | 11/2012 | Campbell et al. |
| 8,355,950 B2 | 1/2013 | Colson et al. |
| 8,407,664 B2 | 3/2013 | Moosmann et al. |
| 8,428,815 B2 | 4/2013 | Van Engelshoven et al. |
| 8,438,310 B2 | 5/2013 | Muilenburg et al. |
| 8,448,057 B1 | 5/2013 | Sugnet |
| 8,521,654 B2 | 8/2013 | Ford et al. |
| 8,538,894 B2 | 9/2013 | Ullman et al. |
| 8,645,193 B2 | 2/2014 | Swinson et al. |
| 8,676,638 B1 | 3/2014 | Blair et al. |
| 8,725,341 B2 | 5/2014 | Ogasawara |
| 8,745,641 B1 | 6/2014 | Coker |
| 8,849,689 B1 | 9/2014 | Jagannathan et al. |
| 8,886,389 B2 | 11/2014 | Edwards et al. |
| 8,924,071 B2 | 12/2014 | Stanek et al. |
| 8,954,222 B2 | 2/2015 | Costantino |
| 8,996,230 B2 | 3/2015 | Lorenz et al. |
| 8,996,235 B2 | 3/2015 | Singh et al. |
| 9,014,908 B2 | 4/2015 | Chen et al. |
| 9,015,059 B2 | 4/2015 | Sims et al. |
| 9,026,304 B2 | 5/2015 | Olsen, III et al. |
| 9,047,722 B2 | 6/2015 | Kurnik et al. |
| 9,122,716 B1 * | 9/2015 | Naganathan ........ G06F 16/2471 |
| 9,165,413 B2 | 10/2015 | Jones et al. |
| 9,183,681 B2 | 11/2015 | Fish |
| 9,325,650 B2 | 4/2016 | Yalavarty et al. |
| 9,349,223 B1 | 5/2016 | Palmer |
| 9,384,597 B2 | 7/2016 | Koch et al. |
| 9,455,969 B1 | 9/2016 | Cabrera et al. |
| 9,477,936 B2 | 10/2016 | Lawson et al. |
| 9,577,866 B2 | 2/2017 | Rogers et al. |
| 9,596,287 B2 | 3/2017 | Rybak et al. |
| 9,619,945 B2 | 4/2017 | Adderly et al. |
| 9,659,495 B2 | 5/2017 | Modica et al. |
| 9,706,008 B2 | 7/2017 | Rajan et al. |
| 9,715,665 B2 | 7/2017 | Schondorf et al. |
| 9,754,304 B2 | 9/2017 | Taira et al. |
| 9,778,045 B2 | 10/2017 | Bang |
| 9,836,714 B2 | 12/2017 | Lander et al. |
| 9,983,982 B1 * | 5/2018 | Kumar ................ G06F 11/3664 |
| 10,032,139 B2 | 7/2018 | Adderly et al. |
| 10,083,411 B2 | 9/2018 | Kinsey et al. |
| 10,169,607 B1 | 1/2019 | Sheth et al. |
| 10,229,394 B1 | 3/2019 | Davis et al. |
| 10,448,120 B1 | 10/2019 | Bursztyn et al. |
| 10,475,256 B2 | 11/2019 | Chowdhury et al. |
| 10,509,696 B1 * | 12/2019 | Gilderman .......... G06F 11/0727 |
| 10,541,938 B1 | 1/2020 | Timmerman et al. |
| 10,552,871 B1 | 2/2020 | Chadwick |
| 10,657,707 B1 | 5/2020 | Leise |
| 11,080,105 B1 | 8/2021 | Birkett et al. |
| 11,117,253 B2 | 9/2021 | Oleynik |
| 11,190,608 B2 | 11/2021 | Amar et al. |
| 11,392,855 B1 | 7/2022 | Murakonda et al. |
| 2001/0005831 A1 | 6/2001 | Lewin et al. |
| 2001/0014868 A1 | 8/2001 | Herz et al. |
| 2001/0037332 A1 | 11/2001 | Miller et al. |
| 2001/0039594 A1 | 11/2001 | Park et al. |
| 2001/0054049 A1 | 12/2001 | Maeda et al. |
| 2002/0023111 A1 | 2/2002 | Arora et al. |
| 2002/0024537 A1 | 2/2002 | Jones et al. |
| 2002/0026359 A1 | 2/2002 | Long et al. |
| 2002/0032626 A1 | 3/2002 | Dewolf et al. |
| 2002/0032701 A1 | 3/2002 | Gao et al. |
| 2002/0042738 A1 | 4/2002 | Srinivasan et al. |
| 2002/0046245 A1 | 4/2002 | Hillar et al. |
| 2002/0049831 A1 | 4/2002 | Platner et al. |
| 2002/0052778 A1 | 5/2002 | Murphy et al. |
| 2002/0059260 A1 | 5/2002 | Jas |
| 2002/0065698 A1 | 5/2002 | Schick et al. |
| 2002/0065739 A1 | 5/2002 | Florance et al. |
| 2002/0069110 A1 | 6/2002 | Sonnenberg |
| 2002/0073080 A1 | 6/2002 | Lipkin |
| 2002/0082978 A1 | 6/2002 | Ghouri et al. |
| 2002/0091755 A1 | 7/2002 | Narin |
| 2002/0107739 A1 | 8/2002 | Schlee |
| 2002/0111727 A1 | 8/2002 | Vanstory et al. |
| 2002/0111844 A1 | 8/2002 | Vanstory et al. |
| 2002/0116197 A1 | 8/2002 | Erten |
| 2002/0116418 A1 | 8/2002 | Lachhwani et al. |
| 2002/0123359 A1 | 9/2002 | Wei et al. |
| 2002/0124053 A1 | 9/2002 | Adams et al. |
| 2002/0128728 A1 | 9/2002 | Murakami et al. |
| 2002/0129054 A1 | 9/2002 | Ferguson et al. |
| 2002/0133273 A1 | 9/2002 | Lowrey et al. |
| 2002/0138331 A1 | 9/2002 | Hosea et al. |
| 2002/0143646 A1 | 10/2002 | Boyden et al. |
| 2002/0154146 A1 | 10/2002 | Rodriquez et al. |
| 2002/0169851 A1 | 11/2002 | Weathersby et al. |
| 2002/0173885 A1 | 11/2002 | Lowrey et al. |
| 2002/0188869 A1 | 12/2002 | Patrick |
| 2002/0196273 A1 | 12/2002 | Krause |
| 2002/0198761 A1 | 12/2002 | Ryan et al. |
| 2002/0198878 A1 | 12/2002 | Baxter et al. |
| 2003/0014443 A1 | 1/2003 | Bernstein et al. |
| 2003/0023632 A1 | 1/2003 | Ries et al. |
| 2003/0033378 A1 | 2/2003 | Needham et al. |
| 2003/0036832 A1 | 2/2003 | Kokes et al. |
| 2003/0036964 A1 | 2/2003 | Boyden et al. |
| 2003/0037263 A1 | 2/2003 | Kamat et al. |
| 2003/0046179 A1 | 3/2003 | Anabtawi et al. |
| 2003/0051022 A1 | 3/2003 | Sogabe et al. |
| 2003/0055666 A1 | 3/2003 | Roddy et al. |
| 2003/0061263 A1 | 3/2003 | Riddle |
| 2003/0065532 A1 | 4/2003 | Takaoka |
| 2003/0065583 A1 | 4/2003 | Takaoka |
| 2003/0069785 A1 | 4/2003 | Lohse |
| 2003/0069790 A1 | 4/2003 | Kane |
| 2003/0074392 A1 | 4/2003 | Campbell et al. |
| 2003/0095038 A1 | 5/2003 | Dix |
| 2003/0101262 A1 | 5/2003 | Godwin |
| 2003/0115292 A1 | 6/2003 | Griffin et al. |
| 2003/0120502 A1 | 6/2003 | Robb et al. |
| 2003/0145310 A1 | 7/2003 | Thames et al. |
| 2003/0177050 A1 | 9/2003 | Crampton et al. |
| 2003/0177175 A1 | 9/2003 | Worley et al. |
| 2003/0225853 A1 | 12/2003 | Wang et al. |
| 2003/0229623 A1 | 12/2003 | Chang et al. |
| 2003/0233246 A1 | 12/2003 | Snapp et al. |
| 2004/0012631 A1 | 1/2004 | Skorski |
| 2004/0039646 A1 | 2/2004 | Hacker |
| 2004/0041818 A1 | 3/2004 | White et al. |
| 2004/0073546 A1 | 4/2004 | Forster et al. |
| 2004/0073564 A1 | 4/2004 | Haber et al. |
| 2004/0088228 A1 | 5/2004 | Mercer et al. |
| 2004/0093243 A1 | 5/2004 | Bodin et al. |
| 2004/0117046 A1 | 6/2004 | Colle et al. |
| 2004/0122735 A1 | 6/2004 | Meshkin et al. |
| 2004/0128320 A1 | 7/2004 | Grove et al. |
| 2004/0139203 A1 | 7/2004 | Graham, Jr. et al. |
| 2004/0148342 A1 | 7/2004 | Cotte |
| 2004/0156020 A1 | 8/2004 | Edwards |
| 2004/0163047 A1 | 8/2004 | Nagahara et al. |
| 2004/0181464 A1 | 9/2004 | Vanker et al. |
| 2004/0199413 A1 | 10/2004 | Hauser et al. |
| 2004/0220863 A1 | 11/2004 | Porter et al. |
| 2004/0225664 A1 | 11/2004 | Casement |

(56) References Cited

U.S. PATENT DOCUMENTS

| | | |
|---|---|---|
| 2004/0230897 A1 | 11/2004 | Latzel |
| 2004/0255233 A1 | 12/2004 | Croney et al. |
| 2004/0267263 A1 | 12/2004 | May |
| 2004/0268225 A1 | 12/2004 | Walsh et al. |
| 2004/0268232 A1 | 12/2004 | Tunning |
| 2005/0015491 A1 | 1/2005 | Koeppel |
| 2005/0021197 A1 | 1/2005 | Zimmerman et al. |
| 2005/0027611 A1 | 2/2005 | Wharton |
| 2005/0043614 A1 | 2/2005 | Huizenga et al. |
| 2005/0065804 A1 | 3/2005 | Worsham et al. |
| 2005/0096963 A1 | 5/2005 | Myr et al. |
| 2005/0108112 A1 | 5/2005 | Ellenson et al. |
| 2005/0114270 A1 | 5/2005 | Hind et al. |
| 2005/0114764 A1 | 5/2005 | Gudenkauf et al. |
| 2005/0108637 A1 | 6/2005 | Sahota et al. |
| 2005/0149398 A1 | 7/2005 | Mckay |
| 2005/0171836 A1 | 8/2005 | Leacy |
| 2005/0176482 A1 | 8/2005 | Raisinghani et al. |
| 2005/0187834 A1 | 8/2005 | Painter et al. |
| 2005/0198121 A1 | 9/2005 | Daniels et al. |
| 2005/0228736 A1 | 10/2005 | Norman et al. |
| 2005/0256755 A1 | 11/2005 | Chand et al. |
| 2005/0267774 A1 | 12/2005 | Merritt et al. |
| 2005/0268282 A1 | 12/2005 | Laird |
| 2005/0289020 A1 | 12/2005 | Bruns et al. |
| 2005/0289599 A1 | 12/2005 | Matsuura et al. |
| 2006/0031811 A1 | 2/2006 | Ernst et al. |
| 2006/0059253 A1 | 3/2006 | Goodman et al. |
| 2006/0064637 A1 | 3/2006 | Rechterman et al. |
| 2006/0123330 A1 | 6/2006 | Horiuchi et al. |
| 2006/0129423 A1 | 6/2006 | Sheinson et al. |
| 2006/0129982 A1 | 6/2006 | Doyle |
| 2006/0136105 A1 | 6/2006 | Larson |
| 2006/0161841 A1 | 7/2006 | Horiuchi et al. |
| 2006/0200751 A1 | 9/2006 | Underwood et al. |
| 2006/0224447 A1 | 10/2006 | Koningstein |
| 2006/0248205 A1 | 11/2006 | Randle et al. |
| 2006/0248442 A1 | 11/2006 | Rosenstein et al. |
| 2006/0265355 A1 | 11/2006 | Taylor |
| 2006/0271844 A1 | 11/2006 | Suklikar |
| 2006/0277588 A1 | 12/2006 | Harrington et al. |
| 2006/0282328 A1 | 12/2006 | Gerace et al. |
| 2006/0282547 A1 | 12/2006 | Hasha et al. |
| 2007/0005446 A1 | 1/2007 | Fusz et al. |
| 2007/0016486 A1 | 1/2007 | Stone et al. |
| 2007/0027754 A1 | 2/2007 | Collins et al. |
| 2007/0033087 A1 | 2/2007 | Combs et al. |
| 2007/0033520 A1 | 2/2007 | Kimzey et al. |
| 2007/0053513 A1 | 3/2007 | Hoffberg |
| 2007/0100519 A1 | 5/2007 | Engel |
| 2007/0150368 A1 | 6/2007 | Arora et al. |
| 2007/0209011 A1 | 9/2007 | Padmanabhuni et al. |
| 2007/0226540 A1 | 9/2007 | Konieczny |
| 2007/0250229 A1 | 10/2007 | Wu |
| 2007/0250327 A1 | 10/2007 | Hedy |
| 2007/0250840 A1 | 10/2007 | Coker et al. |
| 2007/0271154 A1 | 11/2007 | Broudy et al. |
| 2007/0271330 A1 | 11/2007 | Mattox et al. |
| 2007/0271389 A1 | 11/2007 | Joshi et al. |
| 2007/0282711 A1 | 12/2007 | Ullman et al. |
| 2007/0282712 A1 | 12/2007 | Ullman et al. |
| 2007/0282713 A1 | 12/2007 | Ullman et al. |
| 2007/0288413 A1 | 12/2007 | Mizuno et al. |
| 2007/0294192 A1 | 12/2007 | Tellefsen |
| 2007/0299940 A1 | 12/2007 | Gbadegesin et al. |
| 2008/0010561 A1 | 1/2008 | Bay et al. |
| 2008/0015921 A1 | 1/2008 | Libman |
| 2008/0015929 A1 | 1/2008 | Koeppel et al. |
| 2008/0027827 A1 | 1/2008 | Eglen et al. |
| 2008/0119983 A1 | 5/2008 | Inbarajan et al. |
| 2008/0172632 A1 | 7/2008 | Stambaugh |
| 2008/0189143 A1 | 8/2008 | Wurster |
| 2008/0195435 A1 | 8/2008 | Bentley et al. |
| 2008/0195932 A1 | 8/2008 | Oikawa et al. |
| 2008/0201163 A1 | 8/2008 | Barker et al. |
| 2008/0255925 A1 | 10/2008 | Vailaya et al. |
| 2009/0012887 A1 | 1/2009 | Taub et al. |
| 2009/0024918 A1 | 1/2009 | Silverbrook et al. |
| 2009/0043780 A1 | 2/2009 | Hentrich, Jr. et al. |
| 2009/0070435 A1 | 3/2009 | Abhyanker |
| 2009/0089134 A1 | 4/2009 | Uyeki |
| 2009/0106036 A1 | 4/2009 | Tamura et al. |
| 2009/0112687 A1 | 4/2009 | Blair et al. |
| 2009/0138329 A1 | 5/2009 | Wanker |
| 2009/0182232 A1 | 7/2009 | Zhang et al. |
| 2009/0187513 A1 | 7/2009 | Noy et al. |
| 2009/0187939 A1 | 7/2009 | Lajoie |
| 2009/0198507 A1 | 8/2009 | Rhodus |
| 2009/0204454 A1 | 8/2009 | Lagudi |
| 2009/0204655 A1 | 8/2009 | Wendelberger |
| 2009/0222532 A1 | 9/2009 | Finlaw |
| 2009/0265607 A1 | 10/2009 | Raz et al. |
| 2009/0313035 A1 | 12/2009 | Esser et al. |
| 2010/0011415 A1 | 1/2010 | Cortes et al. |
| 2010/0023393 A1 | 1/2010 | Costy et al. |
| 2010/0070343 A1 | 3/2010 | Taira et al. |
| 2010/0082778 A1 | 4/2010 | Muilenburg et al. |
| 2010/0082780 A1 | 4/2010 | Muilenburg et al. |
| 2010/0088158 A1 | 4/2010 | Pollack |
| 2010/0100259 A1 | 4/2010 | Geiter |
| 2010/0100506 A1 | 4/2010 | Marot |
| 2010/0131363 A1 | 5/2010 | Sievert et al. |
| 2010/0235219 A1 | 9/2010 | Merrick et al. |
| 2010/0235231 A1 | 9/2010 | Jewer |
| 2010/0293030 A1 | 11/2010 | Wu |
| 2010/0312608 A1 | 12/2010 | Shan et al. |
| 2010/0318408 A1 | 12/2010 | Sankaran et al. |
| 2010/0324777 A1 | 12/2010 | Tominaga et al. |
| 2011/0010432 A1 | 1/2011 | Uyeki |
| 2011/0015989 A1 | 1/2011 | Tidwell et al. |
| 2011/0022525 A1 | 1/2011 | Swinson et al. |
| 2011/0082804 A1 | 4/2011 | Swinson et al. |
| 2011/0145064 A1 | 6/2011 | Anderson et al. |
| 2011/0161167 A1 | 6/2011 | Jallapuram |
| 2011/0191264 A1 | 8/2011 | Inghelbrecht et al. |
| 2011/0196762 A1 | 8/2011 | Dupont |
| 2011/0224864 A1 | 9/2011 | Gellatly et al. |
| 2011/0231055 A1 | 9/2011 | Knight et al. |
| 2011/0288937 A1 | 11/2011 | Manoogian, III |
| 2011/0307296 A1 | 12/2011 | Hall et al. |
| 2011/0307411 A1 | 12/2011 | Bolivar et al. |
| 2012/0066010 A1 | 3/2012 | Williams et al. |
| 2012/0089474 A1 | 4/2012 | Xiao et al. |
| 2012/0095804 A1 | 4/2012 | Calabrese et al. |
| 2012/0116868 A1 | 5/2012 | Chin et al. |
| 2012/0158211 A1 | 6/2012 | Chen et al. |
| 2012/0209714 A1 | 8/2012 | Douglas et al. |
| 2012/0221125 A1 | 8/2012 | Bell |
| 2012/0265648 A1 | 10/2012 | Jerome et al. |
| 2012/0268294 A1 | 10/2012 | Michaelis et al. |
| 2012/0278886 A1 | 11/2012 | Luna |
| 2012/0284113 A1 | 11/2012 | Pollak |
| 2012/0316981 A1 | 12/2012 | Hoover et al. |
| 2013/0046432 A1 | 2/2013 | Edwards et al. |
| 2013/0080196 A1 | 3/2013 | Schroeder et al. |
| 2013/0080305 A1 | 3/2013 | Virag et al. |
| 2013/0151334 A1 | 6/2013 | Berkhin et al. |
| 2013/0151468 A1* | 6/2013 | Wu .................... G06F 16/178 707/614 |
| 2013/0191445 A1 | 7/2013 | Gayman et al. |
| 2013/0204484 A1 | 8/2013 | Ricci |
| 2013/0226699 A1 | 8/2013 | Long |
| 2013/0317864 A1 | 11/2013 | Tofte et al. |
| 2013/0325541 A1 | 12/2013 | Capriotti et al. |
| 2013/0332023 A1 | 12/2013 | Bertosa et al. |
| 2014/0012659 A1 | 1/2014 | Yan |
| 2014/0026037 A1 | 1/2014 | Garb et al. |
| 2014/0052327 A1 | 2/2014 | Hosein et al. |
| 2014/0081675 A1 | 3/2014 | Ives et al. |
| 2014/0088866 A1 | 3/2014 | Knapp et al. |
| 2014/0094992 A1 | 4/2014 | Lambert et al. |
| 2014/0122178 A1 | 5/2014 | Knight |
| 2014/0136278 A1 | 5/2014 | Carvalho |
| 2014/0229207 A1 | 8/2014 | Swamy et al. |

(56) References Cited

U.S. PATENT DOCUMENTS

| | | |
|---|---|---|
| 2014/0229391 A1 | 8/2014 | East et al. |
| 2014/0244110 A1 | 8/2014 | Tharaldson et al. |
| 2014/0277906 A1 | 9/2014 | Lowrey et al. |
| 2014/0278805 A1 | 9/2014 | Thompson |
| 2014/0316825 A1 | 10/2014 | Van Dijk et al. |
| 2014/0324275 A1 | 10/2014 | Stanek et al. |
| 2014/0324536 A1 | 10/2014 | Cotton |
| 2014/0331301 A1 | 11/2014 | Subramani et al. |
| 2014/0337163 A1 | 11/2014 | Whisnant |
| 2014/0337825 A1* | 11/2014 | Challa ............... G06F 8/71 717/168 |
| 2014/0379530 A1 | 12/2014 | Kim et al. |
| 2014/0379817 A1 | 12/2014 | Logue et al. |
| 2015/0057875 A1 | 2/2015 | McGinnis et al. |
| 2015/0058151 A1 | 2/2015 | Sims et al. |
| 2015/0066781 A1 | 3/2015 | Johnson et al. |
| 2015/0066933 A1 | 3/2015 | Kolodziej et al. |
| 2015/0100199 A1 | 4/2015 | Kurnik et al. |
| 2015/0142256 A1 | 5/2015 | Jones |
| 2015/0142535 A1 | 5/2015 | Payne et al. |
| 2015/0227894 A1 | 8/2015 | Mapes, Jr. et al. |
| 2015/0248761 A1 | 9/2015 | Dong et al. |
| 2015/0254591 A1 | 9/2015 | Raskind |
| 2015/0268059 A1 | 9/2015 | Borghesani et al. |
| 2015/0268975 A1 | 9/2015 | Du et al. |
| 2015/0278886 A1 | 10/2015 | Fusz |
| 2015/0286475 A1 | 10/2015 | Vangelov et al. |
| 2015/0286979 A1 | 10/2015 | Ming et al. |
| 2015/0290795 A1 | 10/2015 | Oleynik |
| 2015/0334165 A1 | 11/2015 | Arling et al. |
| 2016/0004516 A1 | 1/2016 | Ivanov et al. |
| 2016/0059412 A1 | 3/2016 | Oleynik |
| 2016/0071054 A1 | 3/2016 | Kakarala et al. |
| 2016/0092944 A1 | 3/2016 | Taylor et al. |
| 2016/0132935 A1 | 5/2016 | Shen et al. |
| 2016/0140609 A1 | 5/2016 | Demir |
| 2016/0140620 A1 | 5/2016 | Pinkowish et al. |
| 2016/0140622 A1 | 5/2016 | Wang et al. |
| 2016/0148439 A1 | 5/2016 | Akselrod et al. |
| 2016/0162817 A1 | 6/2016 | Grimaldi et al. |
| 2016/0180358 A1 | 6/2016 | Battista |
| 2016/0180378 A1 | 6/2016 | Toshida et al. |
| 2016/0180418 A1 | 6/2016 | Jaeger |
| 2016/0267503 A1 | 9/2016 | Zakai-Or et al. |
| 2016/0275533 A1 | 9/2016 | Smith et al. |
| 2016/0277510 A1 | 9/2016 | Du et al. |
| 2016/0307174 A1 | 10/2016 | Marcelle et al. |
| 2016/0335727 A1 | 11/2016 | Jimenez |
| 2016/0337278 A1 | 11/2016 | Peruri et al. |
| 2016/0357599 A1 | 12/2016 | Glatfelter |
| 2016/0371641 A1 | 12/2016 | Wilson et al. |
| 2017/0034547 A1 | 2/2017 | Jain et al. |
| 2017/0039785 A1 | 2/2017 | Richter et al. |
| 2017/0053460 A1 | 2/2017 | Hauser et al. |
| 2017/0060929 A1* | 3/2017 | Chesla ............... G06F 16/258 |
| 2017/0064038 A1 | 3/2017 | Chen |
| 2017/0093700 A1 | 3/2017 | Gilley et al. |
| 2017/0124525 A1 | 5/2017 | Johnson et al. |
| 2017/0126848 A1 | 5/2017 | George et al. |
| 2017/0262894 A1 | 9/2017 | Kirti et al. |
| 2017/0293894 A1 | 10/2017 | Taliwal et al. |
| 2017/0308844 A1 | 10/2017 | Kelley |
| 2017/0308864 A1 | 10/2017 | Kelley |
| 2017/0308865 A1 | 10/2017 | Kelley |
| 2017/0316459 A1 | 11/2017 | Strauss et al. |
| 2017/0337573 A1 | 11/2017 | Toprak |
| 2017/0352054 A1 | 12/2017 | Ma et al. |
| 2017/0359216 A1 | 12/2017 | Naiden et al. |
| 2017/0364733 A1 | 12/2017 | Estrada et al. |
| 2018/0074864 A1* | 3/2018 | Chen ............... G06F 9/5022 |
| 2018/0095733 A1 | 4/2018 | Torman et al. |
| 2018/0225710 A1 | 8/2018 | Kar et al. |
| 2018/0232749 A1 | 8/2018 | Moore, Jr. et al. |
| 2018/0285901 A1 | 10/2018 | Zackrone |
| 2018/0285925 A1 | 10/2018 | Zackrone |
| 2018/0300124 A1 | 10/2018 | Malladi et al. |
| 2019/0028360 A1 | 1/2019 | Douglas et al. |
| 2019/0073641 A1 | 3/2019 | Utke |
| 2019/0294878 A1 | 9/2019 | Endras et al. |
| 2019/0297162 A1 | 9/2019 | Amar et al. |
| 2019/0334884 A1 | 10/2019 | Ross et al. |
| 2020/0019388 A1 | 1/2020 | Jaeger et al. |
| 2020/0038363 A1 | 2/2020 | Kim |
| 2020/0066067 A1 | 2/2020 | Herman et al. |
| 2020/0118365 A1 | 4/2020 | Wang et al. |
| 2020/0177476 A1 | 6/2020 | Agarwal et al. |
| 2021/0072976 A1 | 3/2021 | Chintagunta et al. |
| 2021/0157562 A1 | 5/2021 | Sethi et al. |
| 2021/0184780 A1* | 6/2021 | Yang ............... H04L 45/54 |
| 2021/0224975 A1 | 7/2021 | Ranca et al. |
| 2021/0256616 A1 | 8/2021 | Hayard et al. |
| 2021/0287106 A1 | 9/2021 | Jerram |
| 2021/0359940 A1 | 11/2021 | Shen et al. |
| 2022/0020086 A1 | 1/2022 | Kuchenbecker et al. |
| 2022/0028928 A1 | 1/2022 | Seo et al. |
| 2022/0046105 A1 | 2/2022 | Amar et al. |
| 2022/0172723 A1 | 6/2022 | Tendolkar et al. |
| 2022/0191663 A1 | 6/2022 | Karpoor et al. |
| 2022/0208319 A1 | 6/2022 | Ansari et al. |
| 2022/0237171 A1 | 7/2022 | Bailey et al. |
| 2022/0293107 A1 | 9/2022 | Leaman et al. |
| 2022/0300735 A1 | 9/2022 | Kelly et al. |

OTHER PUBLICATIONS

U.S. Appl. No. 17/156,254, Non-Final Office Action, dated Feb. 25, 2022, 18 pages.

U.S. Appl. No. 10/665,899, Non-Final Office Action, dated Aug. 30, 2010, 23 pages.

U.S. Appl. No. 10/665,899, Final Office Action, dated Feb. 24, 2010, 22 pages.

U.S. Appl. No. 10/665,899, Final Office Action, dated May 11, 2009, 14 pages.

U.S. Appl. No. 10/665,899, Non-Final Office Action, dated Nov. 13, 2008, 11 pages.

U.S. Appl. No. 10/665,899, Non-Final Office Action, dated Sep. 14, 2009, 14 pages.

U.S. Appl. No. 11/149,909, Final Office Action, dated Feb. 4, 2009, 14 pages.

U.S. Appl. No. 11/149,909, Non-Final Office Action, dated May 13, 2008, 14 pages.

U.S. Appl. No. 11/149,909, Non-Final Office Action, dated May 6, 2009, 6 pages.

U.S. Appl. No. 11/149,909, Notice of Allowance, dated Sep. 16, 2009, 7 pages.

U.S. Appl. No. 11/414,939, Non-Final Office Action, dated Jul. 19, 2010, 7 pages.

U.S. Appl. No. 11/414,939, Notice of Allowance, dated Nov. 2, 2010.

U.S. Appl. No. 11/442,821, Final Office Action, dated Apr. 7, 2009, 19 pages.

U.S. Appl. No. 11/442,821, Notice of Allowance, dated Jul. 30, 2012, 6 pages.

U.S. Appl. No. 11/442,821, Non-Final Office Action, dated Jun. 1, 2011, 23 pages.

U.S. Appl. No. 11/442,821, Final Office Action, dated May 21, 2010, 28 pages.

U.S. Appl. No. 11/442,821, Non-Final Office Action, dated Nov. 12, 2009, 19 pages.

U.S. Appl. No. 11/442,821, Final Office Action, dated Nov. 29, 2011, 26 pages.

U.S. Appl. No. 11/442,821, Non-Final Office Action, dated Sep. 3, 2008, 14 pages.

U.S. Appl. No. 11/446,011, Notice of Allowance, dated Aug. 9, 2011, 10 pages.

U.S. Appl. No. 11/446,011, Final Office Action, dated Jun. 8, 2010, 12 pages.

U.S. Appl. No. 11/446,011, Non-Final Office Action, dated Mar. 1, 2011, 15 pages.

(56) References Cited

OTHER PUBLICATIONS

U.S. Appl. No. 11/446,011, Non-Final Office Action, dated Nov. 27, 2009, 14 pages.
U.S. Appl. No. 11/524,602, Notice of Allowance, dated Aug. 6, 2013, 22 pages.
U.S. Appl. No. 11/524,602, Non-Final Office Action, dated Dec. 11, 2009, 20 pages.
U.S. Appl. No. 11/524,602, Final Office Action, dated Jul. 27, 2010, 13 pages.
U.S. Appl. No. 11/524,602, Final Office Action, dated Jun. 26, 2012, 11 pages.
U.S. Appl. No. 11/524,602, Non-Final Office Action, dated Nov. 14, 2011, 19 pages.
U.S. Appl. No. 11/525,009, Non-Final Office Action, dated Aug. 10, 2011, 18 pages.
U.S. Appl. No. 11/525,009, Final Office Action, dated Aug. 3, 2010, 16 pages.
U.S. Appl. No. 11/525,009, Non-Final Office Action, dated Dec. 16, 2009, 20 pages.
U.S. Appl. No. 11/525,009, Notice of Allowance, dated Jul. 23, 2012, 19 pages.
U.S. Appl. No. 12/243,852, Restriction Requirement, dated Dec. 7, 2010.
U.S. Appl. No. 12/243,852, Notice of Allowance, dated Feb. 27, 2013, 6 pages.
U.S. Appl. No. 12/243,852, Non-Final Office Action, dated Jan. 16, 2013, 5 pages.
U.S. Appl. No. 12/243,852, Non-Final Office Action, dated Mar. 17, 2011, 8 pages.
U.S. Appl. No. 12/243,852, Supplemental Notice of Allowability, dated Mar. 19, 2013, 3 pages.
U.S. Appl. No. 12/243,852, Final Office Action, dated Oct. 24, 2011, 13 pages.
U.S. Appl. No. 12/243,855, Notice of Allowance, dated Nov. 22, 2010, 10 pages.
U.S. Appl. No. 12/243,855, Non-Final Office Action, dated Oct. 14, 2010, 6 pages.
U.S. Appl. No. 12/243,855, Notice of Allowance, dated Oct. 28, 2010, 5 pages.
U.S. Appl. No. 12/243,861, Final Office Action, dated Jun. 22, 2011, 5 pages.
U.S. Appl. No. 12/243,861, Non-Final Office Action, dated Nov. 8, 2010, 8 pgs.
U.S. Appl. No. 12/243,861, Notice of Allowance, dated Sep. 6, 2011, 10 pgs.
U.S. Appl. No. 13/025,019, Non-Final Office Action, dated Apr. 22, 2016, 16 pages.
U.S. Appl. No. 13/025,019, Non-Final Office Action, dated Apr. 5, 2013, 15 pages.
U.S. Appl. No. 13/025,019, Final Office Action, dated Aug. 28, 2015, 25 pages.
U.S. Appl. No. 13/025,019, Final Office Action, dated Dec. 20, 2016, 16 pages.
U.S. Appl. No. 13/025,019, Non-Final Office Action, dated Sep. 18, 2014, 15 pages.
U.S. Appl. No. 13/025,019, Final Office Action, dated Jul. 13, 2018, 11 pages.
U.S. Appl. No. 13/025,019, Non-Final Office Action, dated Oct. 6, 2017, 17 pages.
http://web.archive.org/web/20010718130244/http://chromedata.com/maing2/about/index.asp, 1 pg.
http://web.archive.org/web/20050305055408/http://www.dealerclick.com/, 1 pg.
http://web.archive.org/web/20050528073821/http://www.kbb.com/, 1 pg.
http://web.archive.org/web/20050531000823/http://www.carfax.com/, 1 pg.
Internet Archive Wayback Machine, archive of LDAP Browser.com—FAQ. Archived Dec. 11, 2000. Available at <http://web.archive.org/web/200012110152/http://www.ldapbrowser.com/faq/faq.php3?sID=fe4ae66f023d86909f35e974f3a1ce>.
Internet Archive Wayback Machine, archive of LDAP Browser.com—Product Info. Archived Dec. 11, 2000. Available at <http://web.archive.org/web/200012110541/http://www.ldapbrowser.com/prodinfo/prodinfo.php3?sID=fe4ae66f2fo23d86909f35e974f3a1ce>.
Internet Archive: Audio Archive, http://www.archive.org/audio/audio-searchresults.php?search=@start=0&limit=100&sort=ad, printed May 12, 2004, 12 pgs.
Internet Archive: Democracy Now, http://www.archive.org/audio/collection.php?collection=democracy_now, printed May 12, 2004, 2 pgs.
Java 2 Platform, Enterprise Edition (J2EE) Overview, printed Mar. 6, 2010, 3 pgs.
Java version history—Wikipedia, the free encyclopedia, printed Mar. 6, 2010, 9 pgs.
Permissions in the Java™ 2 SDK, printed Mar. 6, 2010, 45 pgs.
Trademark Application, Serial No. 76375405. 13 pages of advertising material and other application papers enclosed. Available from Trademark Document Retrieval system at Trademark Electronic Search System record for Serial No. 76375405, Word Mark "NITRA".
"An Appointment with Destiny—The Time for Web-Enabled Scheduling has Arrived", Link Fall, 2007, 2 pages.
"How a Solution found a Problem of Scheduling Service Appointments", Automotive News, 2016, 4 pages.
"IBM Tivoli Access Manager Base Administration Guide", Version 5.1. International Business Machines Corporation. Entire book enclosed and cited., 2003, 402 pgs.
"NetFormx Offers Advanced Network Discovery Software", PR Newswire. Retrieved from http://www.highbeam.com/doc/1G1-54102907.html>, Mar. 15, 1999.
"Openbay Announces First-of-its-Kind Connected Car Repair Service", openbay.com, Mar. 31, 2015, 14 pages.
"Service Advisor", Automotive Dealership Institute, 2007, 26 pages.
"XTime.com Web Pages", Jan. 8, 2015, 1 page.
"XTimes Newsletter", vol. 7, 2013, 4 pages.
U.S. Appl. No. 10/350,795, Non-Final Office Action, dated Dec. 26, 2008, 13 pages.
U.S. Appl. No. 10/350,795, Non-Final Office Action, dated Feb. 6, 2006, 11 pages.
U.S. Appl. No. 10/350,795, Non-Final Office Action, dated Jul. 22, 2009, 22 pages.
U.S. Appl. No. 10/350,795, Final Office Action, dated Jul. 6, 2012, 26 pages.
U.S. Appl. No. 10/350,795, Non-Final Office Action, dated Jun. 29, 2006, 11 pages.
U.S. Appl. No. 10/350,795, Non-Final Office Action, dated Mar. 12, 2007, 10 pages.
U.S. Appl. No. 10/350,795, Final Office Action, dated Mar. 3, 2010, 24 pages.
U.S. Appl. No. 10/350,795, Non-Final Office Action, dated May 29, 2008, 10 pages.
U.S. Appl. No. 10/350,795, Notice of Allowance, dated May 7, 2012, 15 pages.
U.S. Appl. No. 10/350,795, Non-Final Office Action, dated Nov. 1, 2010, 19 pages.
U.S. Appl. No. 10/350,796, Notice of Allowance, dated Feb. 1, 2006, 5 pages.
U.S. Appl. No. 10/350,796, Non-Final Office Action, dated May 19, 2005, 7 pages.
U.S. Appl. No. 10/350,810, Notice of Allowance, dated Apr. 14, 2008, 6 pages.
U.S. Appl. No. 10/350,810, Non-Final Office Action, dated Apr. 17, 2007, 12 pages.
U.S. Appl. No. 10/350,810, Final Office Action, dated Apr. 5, 2005, 12 pages.
U.S. Appl. No. 10/350,810, Notice of Non-compliant Amendment, dated Dec. 12, 2006.
U.S. Appl. No. 10/350,810, Non-Final Office Action, dated Dec. 9, 2005, 14 pages.

(56) References Cited

OTHER PUBLICATIONS

U.S. Appl. No. 10/350,810, Final Office Action, dated May 18, 2006, 15 pages.
U.S. Appl. No. 10/350,810, Final Office Action, dated Nov. 14, 2007, 13 pages.
U.S. Appl. No. 10/350,810, Non-Final Office Action, dated Sep. 22, 2004, 10 pages.
U.S. Appl. No. 10/351,465, Non-Final Office Action, dated Jul. 27, 2004, 9 pages.
U.S. Appl. No. 10/351,465, Final Office Action, dated May 5, 2005, 8 pages.
U.S. Appl. No. 10/351,465, Notice of Allowance, dated Sep. 21, 2005, 4 pages.
U.S. Appl. No. 10/351,606, Notice of Allowance, dated Apr. 4, 2006, 12 pages.
U.S. Appl. No. 10/665,899, Non-Final Office Action, dated Sep. 17, 2017, 11 pages.
U.S. Appl. No. 10/351,606, Non-final Office Action, dated Dec. 19, 2005, 7 pages.
U.S. Appl. No. 10/665,899, Final Office Action, dated Mar. 8, 2011, 21 pages.
U.S. Appl. No. 10/351,606, Non-final Office Action, dated May 17, 2004, 5 pages.
U.S. Appl. No. 10/665,899, Final Office Action, dated Jul. 7, 2008, 11 pages.
U.S. Appl. No. 16/911,154, Final Office Action, dated Mar. 28, 2022, 17 pages.
Bedell, Doug, Dallas Morning News, "I Know Someone Who Knows Kevin Bacon". Oct. 27, 1998. 4 pgs.
Chadwick, D.W., "Understanding X.500—The Directory", Available at <http://sec.cs.kent.ac.uk/x500book/>. Entire work cited., 1996.
Chatterjee, Pallab, et al., "On-board diagnostics not just for racing anymore", EDN.com, May 6, 2013, 7 pages.
Chen, Deren, "Business to Business Standard and Supply Chain System Framework in Virtual Enterprises", Computer Supported Cooperative Work in Design, The Sixth International Conference on 2001, pp. 472-476.
Clemens Grelck, "A Multithread Compiler Backend for High-Level Array Programming", 2003.
CNY Business Journal, "Frank La Voila named Southern Tier Small-Business Person of 1999", Jun. 11, 1999, 2 pages.
Croswell, Wayne, "Service Shop Optimiztion", Modern Tire Retailer, May 21, 2013, 7 pages.
Davis, Peter T., et al., "Sams Teach Yourself Microsoft Windows NT Server 4 in 21 Days", Sams® Publishing, ISBN: 0-672-31555-6, 1999, printed Dec. 21, 2008, 15 pages.
Derfler, Frank J., et al., "How Networks Work: Millennium Edition", Que, A Division of Macmillan Computer Publishing, ISBN: 0-7897-2445-6, 2000, 9 pages.
Drawbaugh, Ben, "Automatic Link Review: an expensive way to learn better driving habits", Endgadget.com, Nov. 26, 2013, 14 pages.
Emmanuel, Daniel, "Basics to Creating an Appointment System for Automotive Service Customers", Automotiveservicemanagement.com, 2006, 9 pages.
Hogue, et al., "Thresher: Automating the Unwrapping of Semantic Content from the World Wide Web", ACM, 2005, pp. 86-95.
Housel, Barron C., et al., "WebExpress: A client/intercept based system for optimizing Web browsing in a wireless environment", Google, 1998, pp. 419-431.
Hu, Bo, "A Platform based Distributed Service Framework for Large-scale Cloud Ecosystem Development", IEEE Computer Society, 2015, 8 pages.
Interconnection, In Roget's II The New Thesaurus. Boston, MA: Houghton Mifflin http://www.credoreference.com/entry/hmrogets/interconnection, 2003, Retrieved Jul. 16, 2009, 1 page.
Jenkins, Will, "Real-time vehicle performance monitoring with data intergrity", A Thesis Submitted to the Faculty of Mississippi State University, Oct. 2006, 57 pages.

Johns, Pamela, et al., "Competitive intelligence in service marketing", Marketing Intelligence & Planning, vol. 28, No. 5, 2010, pp. 551-570.
Lavrinc, Damon, "First Android-powered infotainment system coming to 2012 Saab 9-3", Autoblog.com, Mar. 2, 2011, 8 pages.
Lee, Adam J., et al., "Searching for Open Windows and Unlocked Doors: Port Scanning in Large-Scale Commodity Clusters", Cluster Computing and the Grid, 2005. IEEE International Symposium on vol. 1, 2005, pp. 146-151.
Michener, J.R., et al., "Managing System and Active-Content Integrity", Computer; vol. 33, Issue: 7, 2000, pp. 108-110.
Milic-Frayling, Natasa, et al., "SmartView: Enhanced Document Viewer for Mobile Devices", Google, Nov. 15, 2002, 11 pages.
Needham, Charlie, "Google Now Taking Appointments for Auto Repair Shops", Autoshopsolutions.com, Aug. 25, 2015, 6 pages.
Open Bank Project, https://www.openbankproject.com/, retrieved Nov. 23, 2020, 10 pages.
openbay.com Web Pages, Openbay.com, retrieved from archive.org May 14, 2019, Apr. 2015, 6 pages.
openbay.com Web Pages, Openbay.com, retrieved from archive.org on May 14, 2019, Feb. 2014, 2 pages.
openbay.com Web Pages, Openbay.com, retrieved from archive.org, May 14, 2019, Mar. 2015, 11 pages.
Phelan, Mark, "Smart phone app aims to automate car repairs", Detroit Free Press Auto Critic, Mar. 31, 2015, 2 pages.
Pubnub Staff, "Streaming Vehicle Data in Realtime with Automatic (Pt 1)", Pubnub.com, Aug. 17, 2015, 13 pages.
Standards for Technology in Auto, https://www.starstandard.org/, retrieved Nov. 23, 2020, 4 pages.
Strebe, Matthew, et al., MCSE: NT Server 4 Study Guide, Third Edition. SYBEX Inc. Front matter, 2000, pp. 284-293, and 308-347.
Warren, Tamara, "This Device Determines What Ails Your Car and Finds a Repair Shop—Automatically", CarAndDriver.com, Apr. 8, 2015, 7 pages.
You, Song, et al., "Overview of Remote Diagnosis and Maintenance for Automotive Systems", 2005 SAE World Congress, Apr. 11-14, 2015, 10 pages.
U.S. Appl. No. 13/025,019, Final Office Action, dated Sep. 12, 2013, 13 pages.
U.S. Appl. No. 13/025,019, Notice of Allowance, dated Sep. 26, 2019, 9 pages.
U.S. Appl. No. 14/208,042, Final Office Action, dated Apr. 16, 2018.
U.S. Appl. No. 14/208,042, Non-Final Office Action, dated Aug. 21, 2020, 13 pages.
U.S. Appl. No. 14/208,042, Final Office Action, dated Dec. 6, 2016, 26 pages.
U.S. Appl. No. 14/208,042, Final Office Action, dated Jan. 11, 2019, 16 pages.
U.S. Appl. No. 14/208,042, Advisory Action, dated Jul. 12, 2018.
U.S. Appl. No. 14/208,042, Non-Final Office Action, dated Jun. 30, 2016, 23 pages.
U.S. Appl. No. 14/208,042, Notice of Allowance, dated May 6, 2021, 13 pages.
U.S. Appl. No. 14/208,042, Non-Final Office Action, dated Sep. 20, 2017.
U.S. Appl. No. 14/208,042, Non-Final Office Action, dated Sep. 21, 2018.
U.S. Appl. No. 15/134,779, Final Office Action, dated Feb. 27, 2020, 18 pages.
U.S. Appl. No. 15/134,779, Non-Final Office Action, dated Jan. 30, 2019, 26 pages.
U.S. Appl. No. 15/134,779, Advisory Action, dated Jul. 29, 2019, 6 pages.
U.S. Appl. No. 15/134,779, Final Office Action, dated May 17, 2019, 25 pages.
U.S. Appl. No. 15/134,779, Non-Final Office Action, dated Nov. 19, 2019, 27 pages.
U.S. Appl. No. 15/134,779, Notice of Allowance, dated Sep. 9, 2020, 12 pages.
U.S. Appl. No. 15/134,793, Non-Final Office Action, dated Jan. 30, 2019, 26 pages.

(56) References Cited

OTHER PUBLICATIONS

U.S. Appl. No. 15/134,793 , Advisory Action, dated Jul. 29, 2019, 6 pages.
U.S. Appl. No. 15/134,793 , Final Office Action, dated Mar. 27, 2020, 22 pages.
U.S. Appl. No. 15/134,793 , Final Office Action, dated May 13, 2019, 26 pages.
U.S. Appl. No. 15/134,793 , Non-Final Office Action, dated Nov. 19, 2019, 31 pages.
U.S. Appl. No. 15/134,793 , Notice of Allowance, dated Nov. 2, 2020, 13 pages.
U.S. Appl. No. 15/134,820 , Non-Final Office Action, dated Feb. 23, 2018.
U.S. Appl. No. 15/134,820 , Notice of Allowance, dated Jan. 28, 2019, 7 pages.
U.S. Appl. No. 15/134,820 , Final Office Action, dated Sep. 21, 2018.
U.S. Appl. No. 15/478,042 , Non-Final Office Action, dated Aug. 4, 2020, 42 pages.
U.S. Appl. No. 15/478,042 , Final Office Action, dated Mar. 19, 2020, 35 pages.
U.S. Appl. No. 15/478,042 , Final Office Action, dated May 5, 2021, 38 pages.
U.S. Appl. No. 15/478,042 , Non-Final Office Action, dated Oct. 10, 2019, 26 pages.
U.S. Appl. No. 15/478,048 , Final Office Action, dated Apr. 9, 2020, 42 pages.
U.S. Appl. No. 15/478,048 , Non-Final Office Action, dated Mar. 8, 2021, 69 pages.
U.S. Appl. No. 15/478,048 , Final Office Action, dated Sep. 17, 2021, 32 pages.
U.S. Appl. No. 15/478,048 , Non-Final Office Action, dated Sep. 30, 2019, 30 pages.
U.S. Appl. No. 15/602,999 , Notice of Allowance, dated Apr. 18, 2019, 6 pages.
U.S. Appl. No. 15/602,999 , Advisory Action, dated Jan. 31, 2019, 3 pages.
U.S. Appl. No. 15/602,999 , Non-Final Office Action, dated May 3, 2018.
U.S. Appl. No. 15/602,999 , Final Office Action, dated Nov. 21, 2018.
U.S. Appl. No. 16/041,552 , Final Office Action, dated Apr. 27, 2021, 23 pages.
U.S. Appl. No. 16/041,552 , Non-Final Office Action, dated Dec. 27, 2019, 13 pages.
U.S. Appl. No. 16/041,552 , Final Office Action, dated May 29, 2020, 18 pages.
U.S. Appl. No. 16/041,552 , Non-Final Office Action, dated Sep. 17, 2020, 16 pages.
U.S. Appl. No. 16/041,552 , Notice of Allowance, dated Sep. 30, 2021, 17 pages.
U.S. Appl. No. 16/911,154 , Non-Final Office Action, dated Sep. 16, 2021, 15 pages.
U.S. Appl. No. 16/951,833 , Non-Final Office Action, dated Feb. 4, 2021, 10 pages.
U.S. Appl. No. 16/951,833 , Notice of Allowance, dated Jun. 16, 2021, 14 pages.
Aloisio, Giovanni , et al., "Web-based access to the Grid using the Grid Resource Broker portal", Google, 2002, pp. 1145-1160.
Anonymous , "Software ready for prime time", Automotive News. Detroit, vol. 76, Issue 5996, Nov. 5, 2001, p. 28.

\* cited by examiner

SYSTEMS, METHODS, AND APPARATUSES FOR SIMULTANEOUSLY RUNNING PARALLEL DATABASES

TECHNICAL FIELD

The present disclosure relates generally to data validation when replacing a database. More specifically, the present disclosure relates to methods, systems and apparatuses for running parallel databases simultaneously to allow for data validation while creating a replacement environment.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
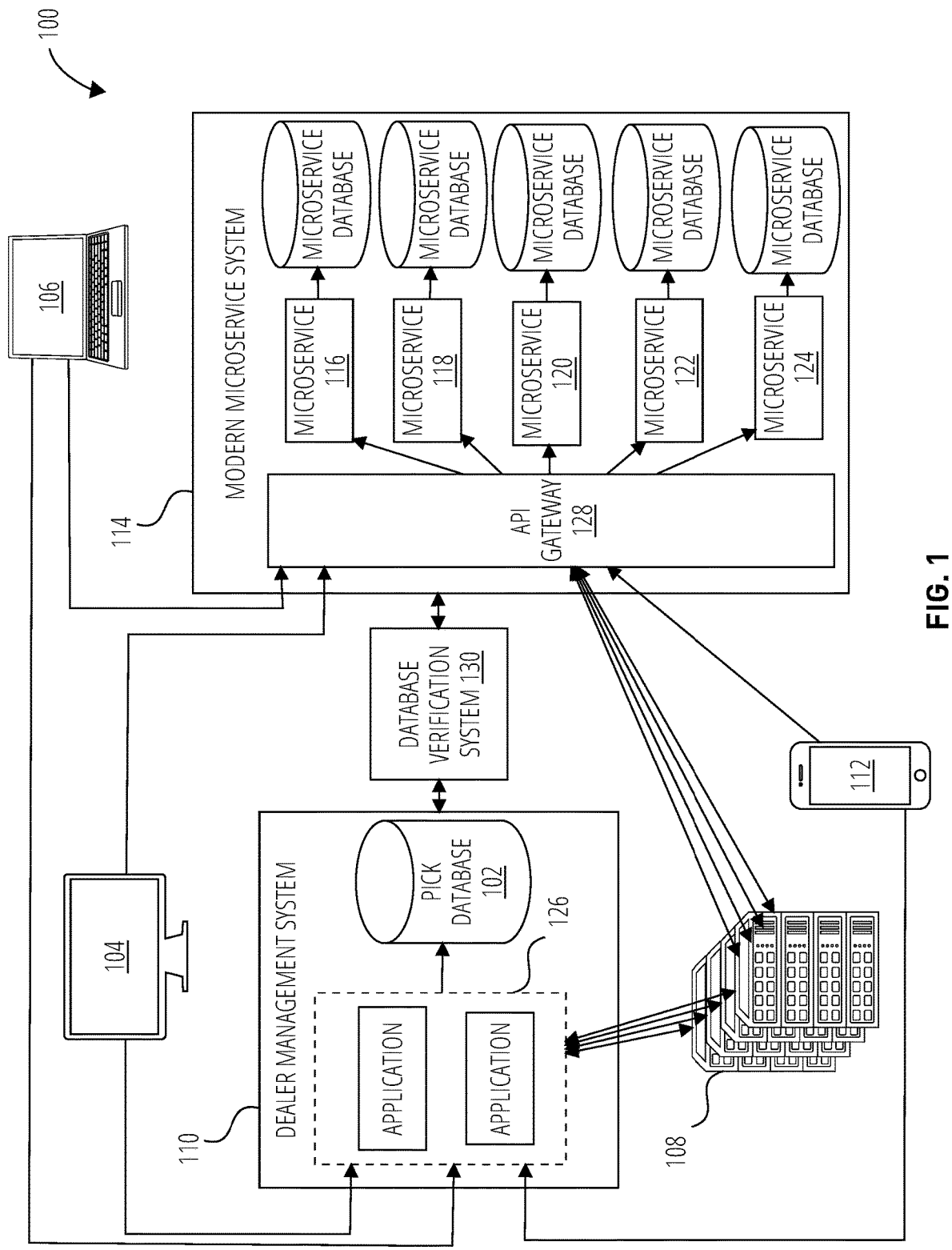
FIG. 1 illustrates an aspect of the subject matter in accordance with one embodiment.

Described herein are embodiments of systems, apparatuses, and methods for running parallel databases (e.g., a legacy database and a modern database) simultaneously to allow for data validation while creating a replacement environment.

Businesses occasionally replace and modernize their database environments. Often the move from a legacy database environment to a modern database environment involves moving between two different incompatible data architectures. Embodiments herein may provide a way to gradually transition between the legacy database and the modern database to allow for data validation of the modern database while allowing applications to take advantage of the modern database.

In some embodiments, to provide data validation the two databases may be run in parallel and a database verification system may compare updates to records in the legacy database against updates to the modern database. As the data needs are verified to be correctly handled by the new database, the new database may replace the legacy database.

Specific embodiments herein relate to replacing a legacy Pick environment with a modern microservice architecture. While movement between a Pick environment and a modern microservice architecture is discussed herein, embodiments herein may also be applied to transitioning between other database types.

The phrases "coupled to," "connected to," and "in communication with" refer to any form of interaction between two or more components, including mechanical, electrical, magnetic, and electromagnetic interaction. Two components may be connected to each other, even though they are not in direct contact with each other, and even though there may be intermediary devices between the two components.

It will be readily understood that the components of the embodiments as generally described below and illustrated in the Figures herein could be arranged and designed in a wide variety of different configurations. For instance, the steps of a method do not necessarily need to be executed in any specific order, or even sequentially, nor do the steps need to be executed only once. Thus, the following more detailed description of various embodiments, as described below and represented in the Figures, is not intended to limit the scope of the disclosure but is merely representative of various embodiments. While the various aspects of the embodiments are presented in the drawings, the drawings are not necessarily drawn to scale unless specifically indicated.

Embodiments and implementations of systems and methods described herein may include various steps, which may be embodied in machine-executable instructions to be executed by a computer system. A computer system may include one or more general-purpose or special-purpose computers (or other electronic devices). The computer system may include hardware components that include specific logic for performing the steps or may include a combination of hardware, software, and/or firmware.

Embodiments may be provided as a computer program product including a computer-readable medium having stored thereon instructions that may be used to program a computer system or other electronic device to perform the processes described herein. The computer-readable medium may include, but is not limited to: hard drives, floppy disks, optical disks, CD-ROMs, DVD-ROMs, ROMs, RAMs, EPROMs, EEPROMs, magnetic or optical cards, solid-state memory devices, or other types of media/computer-readable media suitable for storing electronic instructions.

Computer systems and the computers in a computer system may be connected via a network. Suitable networks for configuration and/or use as described herein include one or more local area networks, wide area networks, metropolitan area networks, and/or Internet or Internet Protocol (IP) networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and several clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using Transfer Control Protocol (TCP)/IP, SPX, IPX, and other protocols over twisted pair, coaxial, or optical fiber cables; telephone lines; radio waves; satellites; microwave relays; modulated AC power lines; physical media transfer; and/or other data transmission "wires" known to those of skill in the art. The network may encompass smaller networks and/or be connectable to other networks through a gateway or similar mechanism.

Each computer system includes one or more processors and/or memory; computer systems may also include various input devices and/or output devices. The processor may include a general-purpose device, such as an Intel®, AMD®, or other "off-the-shelf" microprocessor. The processor may include a special-purpose processing device, such as an ASIC, SoC, SiP, FPGA, PAL, PLA, FPLA, PLD, or other customized or programmable device. The memory may include static RAM, dynamic RAM, flash memory, one or more flip-flops, ROMs, CD-ROMs, disks, tapes, or magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The computer systems may be capable of using a floppy drive, tape drive, optical drive, magneto-optical drive, or other means to read a storage medium. A suitable storage medium includes a magnetic, optical, or other computer-readable storage device having a specific physical configuration. Suitable storage devices include floppy disks, hard drives, tapes, CD-ROMs, DVDs, PROMs, RAMs, and flash memory and other computer system storage devices. The physical configuration represents data and instructions which cause the computer system to operate in a specific and predefined manner as described herein.

Suitable software to assist in implementing the invention is readily provided by those of skill in the pertinent art(s) using the teachings presented here and programming languages and tools such as Modern Fortran, Java, Pascal, C++, C, PHP, .Net, database languages, APIs, SDKs, and assembly, firmware, microcode, and/or other languages and tools. Suitable signal formats may be embodied in analog or digital form, with or without error detection and/or correction bits, packet headers, network addresses in a specific format, and/or other supporting data readily provided by those of skill in the pertinent art(s).

Aspects of certain embodiments may be implemented as software modules or components. As used herein, a software module or component may include any type of computer instruction or computer executable code located within or on a computer-readable storage medium. A software module may, for instance, comprise one or more physical or logical blocks of computer instructions, which may be organized as a routine, program, object, component, data structure, etc., that performs one or more tasks or implements particular abstract data types. A particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media.

Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network. According to one embodiment, a database management system (DBMS) allows users to interact with one or more databases and provides access to the data contained in the databases.

FIG. 1 illustrates a block diagram of a data system 100 transitioning from a dealer management system 110 to a modern microservice system 114. As shown, the data system 100 may operate two databases in parallel during a transition from a legacy database (e.g., dealer management system 110) to a modern database (e.g., modern microservice system 114). This may provide a way to prevent breaking applications, provide a time to transition between databases, and provide a way to fall back to the dealer management system 110 if the modern microservice system 114 fails. Running the two databases in parallel may allow for a gradual roll out of the new architecture in a way that permits data validation and allows older applications to take advantage of the new environment.

The dealer management system 110 may include applications 126 designed as a single unit. This may make for limited reuse of functionality across the applications 126. Conversely, the modern microservice system 114 may include loosely coupled microservices (e.g., microservices 116, 118, 120, 122, 124). These microservices each may support a single business task. An API Gateway 128 may allow a client to use the functionality of the microservices. Thus, the microservices may provide a flexible and reusable element to be used by multiple applications 126.

An application for a desktop interface 104 may have been developed for the legacy dealer management system 110. To upgrade to the modern microservice system 114 it may be desirous to have the application access both the modern microservice system 114 and the dealer management system 110 in parallel and track the changes in the dealer management system 110 in comparison to the modern microservice system 114 to validate that all of the changes to data in the dealer management system 110 are being captured by the modern microservice system 114.

The complex nature of the dealer management system 110 and the variety of different paths by which data may be altered can make it difficult to account for everything when building the modern microservice system 114. For example, a business may desire to replace a legacy Pick environment (e.g., dealer management system 110) with a modern microservice architecture (e.g., modern microservice system 114). A Pick environment includes an operating system for databases that was developed decades ago. The Pick environment has an architecture with a centralized dealer management system 110 with applications 126 and a Pick database 102. A dealer management system 110 may refer to a stand-alone computer system that hosts the legacy data and code. Each client (i.e., a user of the data system 100) may have at least one dealer management system 110 to host the client's applications 126 and data. Occasionally a client may have more than one dealer management system 110.

The legacy software and database for the dealer management system 110 may have been developed over a long period of time. As a consequence, there may be a very large amount of messy code, messy database design, and a very large amount of complexity. For example, information corresponding to a specific object (e.g., customer, vendor, financial institution) controlled by an application may be spread over several data files. To further complicate matters, the data files may not be homogenous with respect to one object. For example, information corresponding to a customer may be in the same data file as information corresponding to a vendor. This unorganized and complicated set of data files may make it difficult to track changes to each object and make it difficult to compare changes made to the dealer management system 110 and the modern microservice system 114.

In contrast to the organization of the dealer management system 110, the new modern microservice system 114 may have a data architecture that structures an application as a collection of services which store information on a modern database. For example, the application controllable objects that are spread across multiple data files in the dealer management 110 may be ordered according to independent services. This change in data architecture from the dealer management system 110 to the modern microservice system 114 and the complexity of the dealer management system 110 makes data validation difficult and inefficient.

Further, there may be many different ways of updating a business object on the dealer management system 110. For example, the business objects may be updated by a user via one or more interfaces (e.g., desktop interface 104, web interface 106, mobile interface 112) of the applications 126. Additionally, a variety of external services 108 may be used to alter business object data. For example, one of the external services 108 may be an outside business that the applications 126 rely on to convert a customer address to a standardized format. The complex web of paths by which data may be updated may lead to the modern microservice system 114 failing to capture each change.

Thus, running the two databases in parallel may allow errors to be found, allow time to correct problems, and provide a fallback if the modern microservice system 114 fails. To reduce the complexity and improve efficiency of data validation, a database verification system 130 may track, filter, and compare updates to information corresponding to the business objects. A database verification system 130 may monitor changes on the disparate databases, validate that the changes are reflected on both databases and determine when to transition fully to the modern microservice system 114. The database verification system 130 may prevent the data system 100 from breaking if the modern microservice system 114 fails to capture data changes. If the modern microservice system 114 fails, the data system 100 may revert back to the old system. Running the databases in parallel should cause the interactions between the desktop interface 104, the web interface 106, the mobile interface 112, and the external services 108 and the dealer management system 110 to be duplicated to the modern microservice system 114. If the database verification system 130 identifies discrepancies, it may generate an alert that provides a database administrator information to solve issues with the modern microservice system 114. Thus, if some data paths or functionality are missed by the modern microservice system 114, the discrepancies may be corrected.

Figure 2:
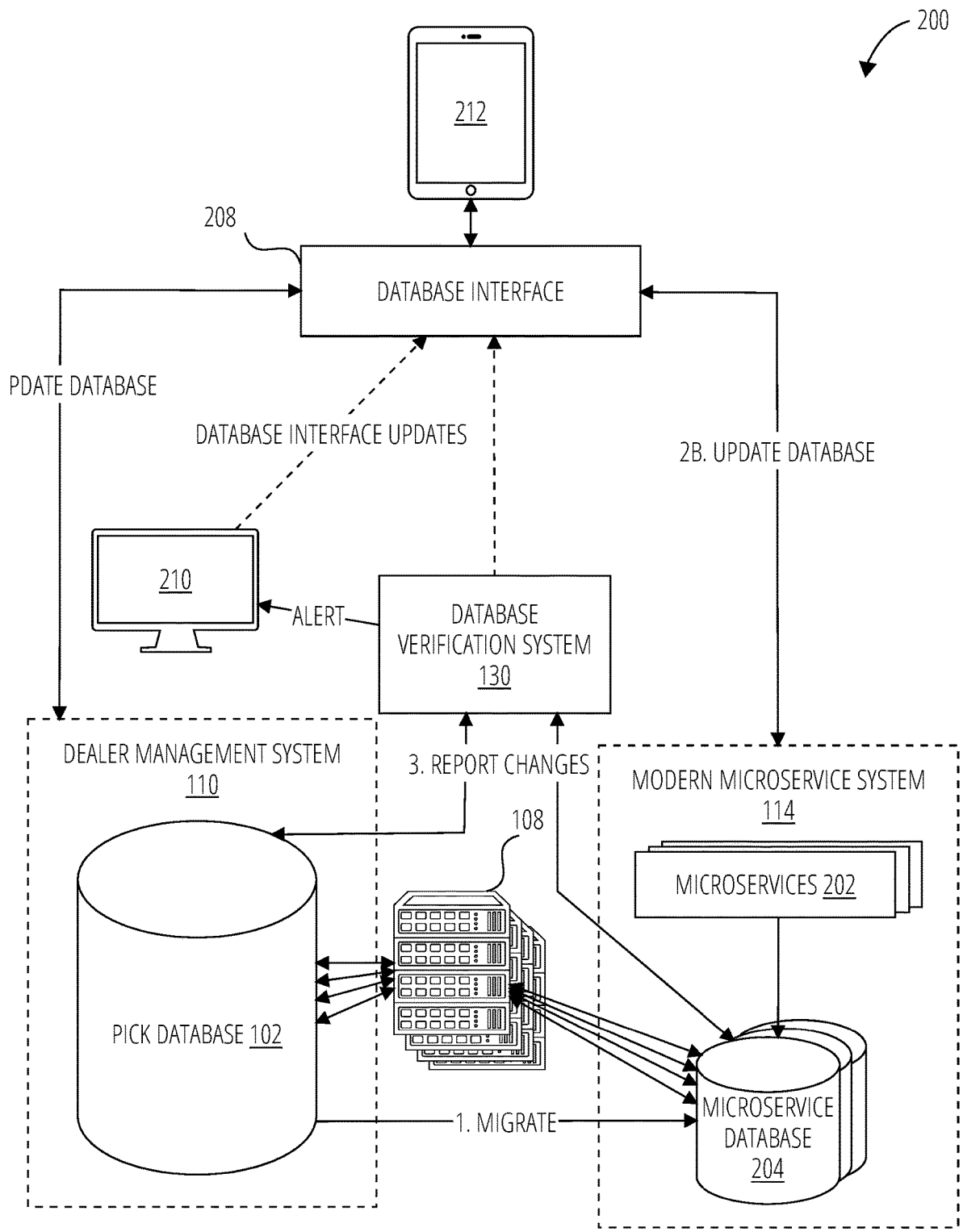
FIG. 2 illustrates an aspect of the subject matter in accordance with one embodiment.

FIG. 2 illustrates a simplified signal flow diagram 200 for a database verification system 130 according to one embodiment. The dealer management system 110 and the modern microservice system 114 operate in parallel. That is, the modern microservice system 114 attempts to provide a set of microservices 202 that duplicate the behavior of the applications of the dealer management system 110. The parallel operation may allow an end user to use the computing device 212 while developers continue to build and correct the modern microservice system 114. Thus the end user is able to use applications without interruption and developers can use the end user's activities as test data to develop the modern microservice system 114.

The database verification system 130 verifies that the modern microservice system 114 handles the data in a same manner as the dealer management system 110. Thus, a business can replace a legacy Pick environment (e.g., centralized dealer management system, with applications and database) with a modern microservice architecture. Running the databases in parallel may allow a gradual roll out of the new architecture in a way that permits data validation and allows older applications to take advantage of the new environment.

The signal flow diagram 200 only shows a single computing device 212 for simplicity. However, as shown in FIG. 1 there may be many paths by which business objects on the databases may be updated. Accordingly, the procedures discussed in relation to verifying that changes caused by the computing device 212 are correctly captured by the modern microservice system 114 may be applied to each device, service, or application that may make changes to the business objects. Additionally, the illustrated embodiment only shows one dealer management system 110. However, a plurality of businesses (e.g., car dealership, rental car company, retailer) may each have its own dealer management system 110. Accordingly, the same process may be run to migrate each dealer management system 110 to a modern microservice system 114.

To create a new database (e.g., modern microservice system 114), the existing database (e.g., dealer management system 110) may be analyzed. During this phase, a system may restructure the old information stored on the Pick database 102, remove elements that represent obsolete information, and add new data elements. To run the two databases (i.e., dealer management system 110 and the modern microservice system 114) in parallel, the database verification system 130 may do the following.

The legacy data on the Pick database 102 is migrated to the microservice database 204. To do this, the database verification system 130 may make a copy of the data currently on the data system 100 and send it to the microservice database 204. At this point, both databases should include the same data.

Additionally, a database interface 208 may be configured such that when a service makes any updates, both databases will be updated simultaneously. For example, the computing device 212 or the external services 108 may communicate with both of the databases regarding changes to a business object. For example, the computing device 212 may receive customer information such as home address, email address, phone number, and customer name via a graphical user interface. This computing device 212 may send customer information to update both the dealer management system 110 and the modern microservice system 114. The external services 108 may also provide updates to both databases, such as changing home address or dates to a standardized format.

In some embodiments, a database interface 208 may facilitate communication between the computing device 212 and the databases (e.g., dealer management system 110 and modern microservice system 114). The database interface 208 may be integrated in the service, application, or interface on the computing device 212. For example, the database interface 208 may be programed into a mobile or desktop application or a website. In some embodiments, the database interface 208 may also be a service external to the computing device 212.

The updated information may be displayed by the computing device 212 and used by the external services 108. In some embodiments, the computing device 212 only displays the information stored on the master copy of a business object. The master copy of the business object may be from the Pick database 102 during verification of the modern microservice system 114, and the master copy of the business object may be from the modern microservice system 114 after the verification process.

The database verification system 130 may request and receive changes to the databases. Changes that occur on modern microservice system 114 or on dealer management system 110 may be reported to the database verification system 130. During the verification phase, the dealer management system 110 is used as the master copy. Any updates to the Pick database 102 may be checked against the microservice database 204 to verify consistency and integrity. Similarly, updates to the microservice database 204 may be checked against the Pick database 102 to verify consistency and integrity.

In some embodiments, the reported changes are converted by the database verification system 130 into a common format, such as JSON, to improve computing efficiency when comparing the changes. Additionally because of the architecture differences, scanning for and reporting updates may be inefficient. One of the challenges of the transition between databases is handling the large number of updates to the legacy database. To address this challenge, in some embodiments below, a scanner service may be configured to scan and recognize business objects across the multiple records of the Pick database 102. The scanner service may filter out updates that are not part of a business object as well as combine separate components that together comprise a business object. The scanner service may provide an update message with the filtered and combined results.

The database verification system 130 compares the updates to the databases. If the changes are not the same, the database verification system 130 may send an alert to an administrative computing device 210. Additionally, in some embodiments, if a change in one database is reported and no change is reported by the other database, the database verification system 130 may send an alert to an administrative computing device 210. The alert may provide information relative to the discrepancy to assist in improving the modern microservice system 114. For example, the alert may indicate the business object, the element of the business object, and what device or external services 108 made the update.

After the database verification system 130 has verified that all data needs are being satisfied by the modern microservice system 114, the database verification system 130 may switch to using the modern microservice system 114 as the master copy rather than the dealer management system 110. The database verification system 130 may verify the modern microservice system 114 based on one or more conditions. For example, the modern microservice system 114 may be verified after a period of time with no discrepancies between the reported changes. In some embodiments, the verification may be achieved by performing a certain number of updates without discrepancies between the databases. In some embodiments, the database verification system 130 may verify the modern microservice system 114 based on business objects changed and data paths used to change those objects. For example, the database verification system 130 may compile an updated list of business objects changed and which data paths have been used to update information. The database verification system 130 may compare the data paths and the business objects to a master list that includes many or all data paths and business objects used by the dealer management system 110. The database verification system 130 may verify the modern microservice system 114 when the updated list matches the master list without discrepancies in the reported changes.

After verification, the database verification system 130 or the administrative computing device 210 may update the database interface 208 to make the modern microservice system 114 the master database. In some embodiments, this update may change the database interface 208 to only update the modern microservice system 114. In some embodiment, the database interface update may occur after the entire modern microservice system 114 has been verified. In other embodiments, the database interface update to change the modern microservice system 114 to the main database may occur in segments. For example, after each application or microservice is verified, the modern microservice system 114 may be made the master copy of data controlled by the verified application or microservice.

Figure 3:
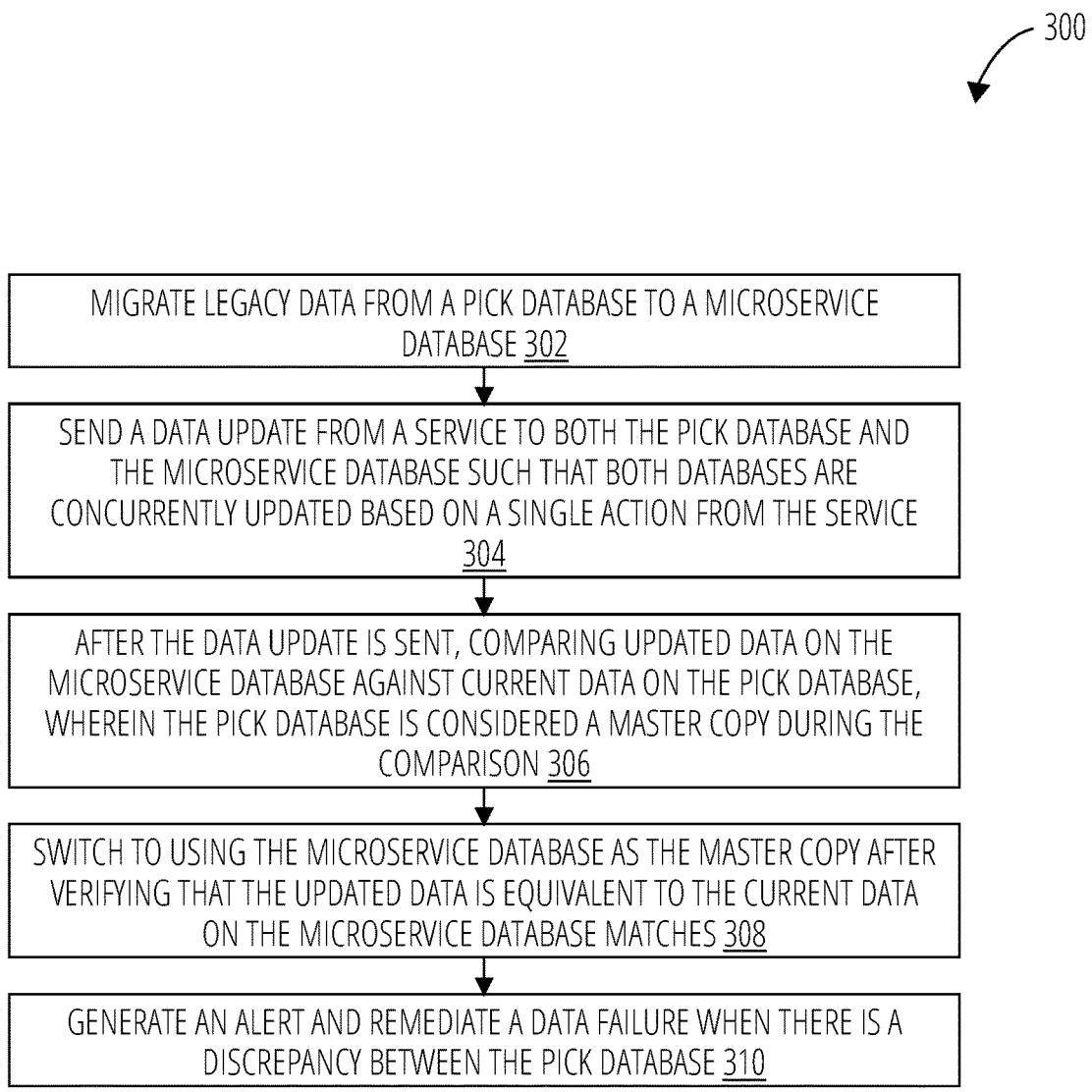
FIG. 3 illustrates a method for creating a replacement database in accordance with one embodiment.

FIG. 3 illustrates a method 300 for running parallel databases simultaneously to allow for data validation while creating a replacement environment. The method 300 may be performed by a database verification system such as the database verification system 130 in FIG. 2.

The method 300 migrates 302 legacy data from a Pick database to a microservice database. The method 300 sends 304 a data update from a service to both the Pick database and the microservice database such that both databases are concurrently updated based on a single action from the service. The method 300 may, after the data update is sent, compare 306 updated data on the microservice database against current data on the Pick database. During this phase, the Pick database may be considered a master copy during the comparison.

The method 300 may switch 308 to using the microservice database as the master copy after verifying that the updated data is equivalent to the current data on the microservice database. In some embodiments, verification occurs after a target period of time with no discrepancies between the modern database and the legacy database. The switch to the new modern database may occur after all data needs are verified. In other embodiments, the switch to the new modern database may occur in segments such that data controlled by a service of the microservice database is the master copy after the service has been verified. In some embodiments, the method 300 may generate 310 an alert and remediate a data failure when there is a discrepancy between the Pick database and the microservice database. The alert may include one or more of the information that is mismatched, the associated business object, and the data path used to update the information.

Figure 4:
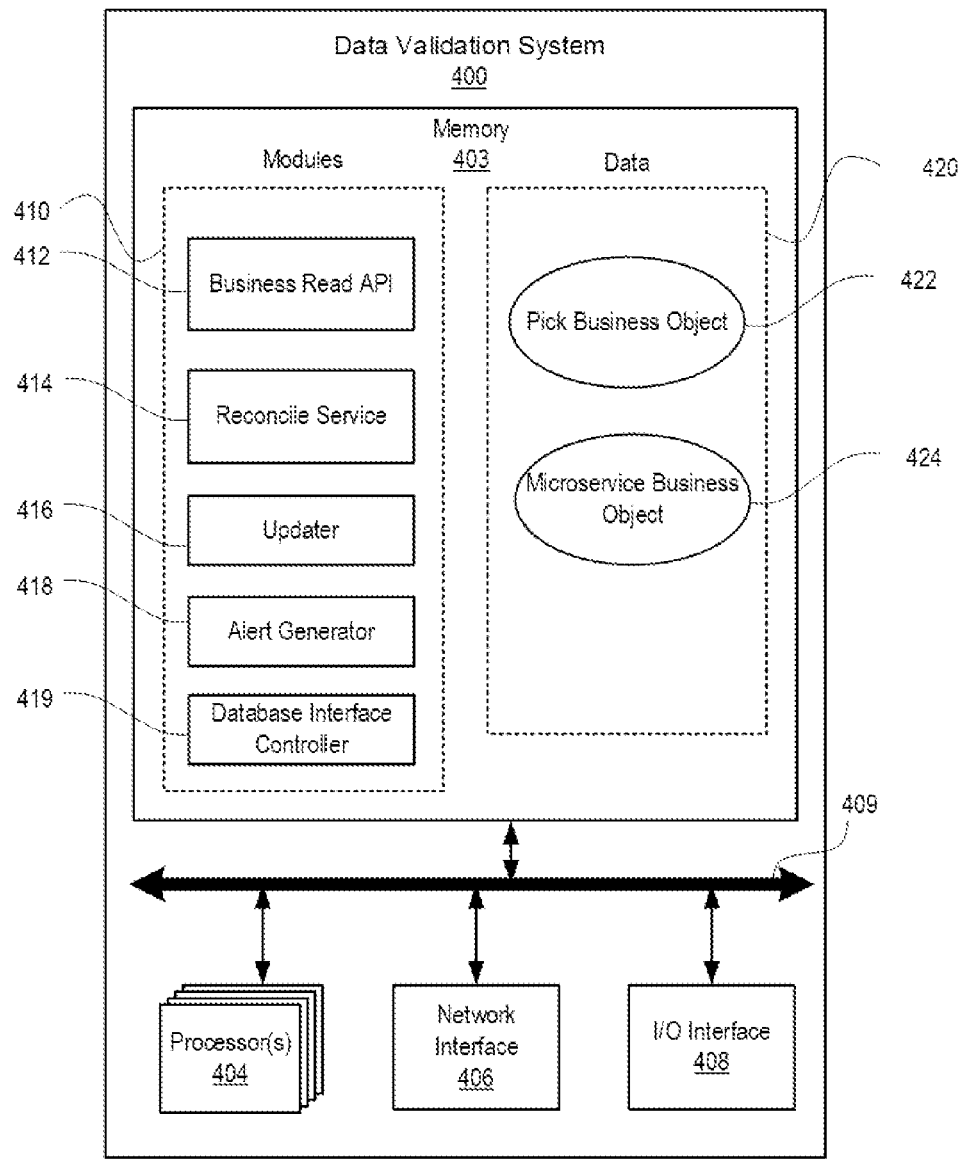
FIG. 4 illustrates an aspect of the subject matter in accordance with one embodiment.

FIG. 4 is a block diagram of a data validation system 400 according to one embodiment. The data validation system 400 may perform the methods and use the techniques described with reference to the other Figures in the specification. The data validation system 400 can include a memory 403, one or more processors 404, a network interface 406, an input/output interface 408 and a system bus 409.

The one or more processors 404 may include one or more general-purpose devices, such as an Intel®, AMD®, or other standard microprocessor. The one or more processors 404 may include a special-purpose processing device, such as ASIC, SoC, SiP, FPGA, PAL, PLA, FPLA, PLD, or other customized or programmable device. The one or more processors 404 can perform distributed (e.g., parallel) processing to execute or otherwise implement functionalities of the presently disclosed embodiments. The one or more processors 404 may run a standard operating system and perform standard operating system functions. It is recognized that any standard operating system may be used, such as, for example, Microsoft® Windows®, Apple® MacOS®, Disk Operating System (DOS), UNIX, IRJX, Solaris, SunOS, FreeBSD, Linux®, ffiM® OS/2® operating systems, and so forth.

The memory 403 may include static RAM, dynamic RAM, flash memory, one or more flip-flops, ROM, CD-ROM, DVD, disk, tape, or magnetic, optical, or other computer storage medium. The memory 403 may include a plurality of program modules 410 and program data 420. The memory 403 may be local to the data validation system 400, as shown, or may be distributed and/or remote relative to the data validation system 400.

Data generated or used by the data validation system 400, such as by the program modules 410 or other modules, may be stored on the memory 403, for example, as stored program data 420. The data 420 may be organized as one or more databases. The data 420 may include Pick business object 422 and a corresponding microservice business object 424. The Pick business object 422 may comprise a business object obtained from a Pick database. The microservice business object 424 may include a business object obtained from a modern database system and correspond to the Pick business object 422.

The program modules 410 may run multiple operations concurrently or in parallel by or on the one or more processors 404. In some embodiments, portions of the disclosed modules, components, and/or facilities are embodied as executable instructions embodied in hardware or firmware, or stored on a non-transitory, machine-readable storage medium. The executable instructions may comprise computer program code that, when executed by a processor and/or computing device, cause a computing system to implement certain processing steps, procedures, and/or operations, as disclosed herein. The modules, components, and/or facilities disclosed herein may be implemented and/or embodied as a driver, a library, an interface, an API, FPGA configuration data, firmware (e.g., stored on an EEPROM), and/or the like. In some embodiments, portions of the modules, components, and/or facilities disclosed herein are embodied as machine components, such as general and/or application-specific devices, including, but not limited to: circuits, integrated circuits, processing components, interface components, hardware controller(s), storage controller(s), programmable hardware, FPGAs, ASICs, and/or the like. Accordingly, the modules disclosed herein may be referred to as controllers, layers, services, engines, facilities, drivers, circuits, subsystems, and/or the like.

The modules 410 may comprise a business read API 412, a reconcile service 414, an updater 416, an alert generator 418, and a database interface controller 419. The business read API 412 may receive corresponding business objects from two disparate databases and convert the business objects into a common format. The reconcile service 414 may compare the two business objects to determine if there are discrepancies. If a discrepancy is found, the updater 416 may update the modern database based on the record of the legacy database. The alert generator 418 may compose and transmit an alert to a database administrator when discrepancies between the two databases are discovered. The database interface controller 419 may make adjustments to which databases are used by an application. For example, after the new database is updated, the database interface controller 419 may cause an application to stop transmitting data to both databases and instead just update the new database.

The input/output interface 408 may facilitate user interaction with one or more input devices and/or one or more output devices. The input device(s) may include a keyboard, mouse, touchscreen, light pen, tablet, microphone, sensor, or other hardware with accompanying firmware and/or software. The output device(s) may include a monitor or other display, printer, speech or text synthesizer, switch, signal line, or other hardware with accompanying firmware and/or software. For example, in one embodiment, the input/output interface 408 comprises a display to provide a graphical user interface (GUI) illustrating the potential ablation perimeters. The input/output interface 408 can receive user input data. In some embodiments, the input/output interface 408 is a touchscreen, and the size input is received via the touchscreen.

The network interface 406 may facilitate communication with other computing devices and/or networks and/or other computing and/or communications networks. The network interface 406 may be equipped with conventional network connectivity, such as, for example, Ethernet (IEEE 1102.3), Token Ring (IEEE 1102.5), Fiber Distributed Datalink Interface (FDDI), or Asynchronous Transfer Mode (ATM). Further, the network interface 406 may be configured to support a variety of network protocols such as, for example, IP, TCP, Network File System over UDP/TCP, Server Message Block (SMB), Microsoft® Common Internet File System (CIFS), Hypertext Transfer Protocols (HTTP), Direct Access File System (DAFS), File Transfer Protocol (FTP), Real-Time Publish Subscribe (RTPS), Open Systems Interconnection (OSI) protocols, Simple Mail Transfer Protocol (SMTP), Secure Shell (SSH), Secure Socket Layer (SSL), and so forth.

The system bus 409 may facilitate communication and/or interaction between the other components of the data validation system 400, including the one or more processors 404, the memory 403, the input/output interface 408, and the network interface 406.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

While specific embodiments of stents have been illustrated and described, it is to be understood that the disclosure provided is not limited to the precise configuration and components disclosed. Various modifications, changes, and variations apparent to those of skill in the art having the benefit of this disclosure may be made in the arrangement, operation, and details of the methods and systems disclosed, with the aid of the present disclosure.

Without further elaboration, it is believed that one skilled in the art can use the preceding description to utilize the present disclosure to its fullest extent. The examples and embodiments disclosed herein are to be construed as merely illustrative and exemplary and not a limitation of the scope of the present disclosure in any way. It will be apparent to those having skill in the art, having the benefit of this disclosure, that changes may be made to the details of the above-described embodiments without departing from the underlying principles of the disclosure herein.

What is claimed is:

1. A method for creating a replacement database, the method comprising:
    migrating legacy data from a Pick database to a microservice database, the migrating including making a copy of the data currently on the Pick database and sending it to the microservice database;
    sending a data update from a service to both the Pick database and the microservice database such that both databases are concurrently updated, including updated data on the microservice database and current data on the Pick database, based on a single action from the service;

comparing the updated data on the microservice database against the current data on the Pick database, wherein the Pick database is considered a master copy during the comparison;

verifying that the updated data on the microservice database is equivalent to the current data on the Pick database, the verifying comprising:

compiling a list of updated business objects associated with the microservice database and a corresponding data path for each updated business object, comparing the updated business objects and their corresponding data paths to a master list associated with a dealer management system, and validating that changes to the current data on the Pick database are captured by the updated data on the microservice database; and based on the validation, switching to using the microservice database as the master copy.

2. The method of claim 1, further comprising identifying paths by which the data update is sent.

3. The method of claim 1, wherein switching to using the microservice database as the master copy occurs after all data needs are verified.

4. The method of claim 1, wherein switching to using the microservice database as the master copy occurs in segments such that data controlled by a service of the microservice database is the master copy after the service has been verified.

5. The method of claim 1, further comprising generating an alert and remediating a data failure when there is a discrepancy between the Pick database and the microservice database.

6. The method of claim 1, further comprising verifying the microservice database, wherein verification occurs after a target period of time with no discrepancies between the Pick database and the microservice database.

7. The method of claim 1, wherein the Pick database is part of the dealer management system, and wherein the dealer management system is a centralized dealer management system.

8. A system comprising:
a dealer management system comprising a Pick database;
a modern microservice system comprising a microservice database;
a database interface configured to send data updates from a service to both the Pick database and the microservice database such that both databases are concurrently updated based on a single action from the service;
a database verification system comprising:
a processor; and
a memory storing instructions that, when executed by the processor, configure the database verification system to:
migrate legacy data from the Pick database to the microservice database, including making a copy of data currently on the Pick database and sending it to the microservice database;
detect a data update on the Pick database or the microservice database;
after the data update is detected, compare updated data on the microservice database against current data on the Pick database, wherein the Pick database is considered a master copy during the comparison;

verify that the updated data on the microservice database is equivalent to the current data on the Pick database, the verifying comprising:

compiling a list of updated business objects associated with the microservice database and a corresponding data path for each updated business object, comparing the updated business objects and their corresponding data paths to a master list associated with a dealer management system, and validating that changes made to the current data on the Pick database are captured by the updated data on the microservice database; and based on the validation, modify the database interface to only send new data updates to the microservice database, wherein the microservice database is considered the master copy.

9. The computing apparatus of claim 8, wherein the instructions further configure the database verification system to identify paths by which the data update is sent.

10. The computing apparatus of claim 8, wherein modifying the database interface occurs after all data needs are verified.

11. The computing apparatus of claim 8, wherein modifying the database interface occurs in segments such that data controlled by a service of the microservice database is the master copy after the service has been verified.

12. The computing apparatus of claim 8, wherein the instructions further configure the database verification system to generate an alert and remediate a data failure when there is a discrepancy between the Pick database and the microservice database.

13. The computing apparatus of claim 8, wherein the instructions further configure the database verification system to verify the microservice database, wherein verification occurs after a target period of time with no discrepancies between the Pick database and the microservice database.

14. The computing apparatus of claim 8, wherein the Pick database is part of the dealer management system, and wherein the dealer management system is a centralized dealer management system.

15. A non-transitory computer-readable storage medium, the computer-readable storage medium including instructions that when executed by a computer, cause the computer to:

migrate legacy data from a Pick database to a microservice database, the migrating including making a copy of data currently on the Pick database and sending it to the microservice database;

send a data update from a service to both the Pick database and the microservice database such that both databases are concurrently updated based on a single action from the service, including updated data on the microservice database and current data on the Pick database;

compare the updated data on the microservice database against the current data on the Pick database, wherein the Pick database is considered a master copy during the comparison;

verify that the updated data on the microservice database is equivalent to the current data on the Pick database, the verifying comprising:

compiling a list of updated business objects associated with the microservice database and a corresponding data path for each updated business object, comparing the updated business objects and their corresponding data paths to a master list associated with a dealer management system, and validating that changes to the current data on the Pick database are captured by the updated data on the microservice database; and based on the validation, switch to using the microservice database as the master copy.

16. The computer-readable storage medium of claim 15, wherein the instructions further configure the computer to identify paths by which the data update is sent.

17. The computer-readable storage medium of claim 15, wherein switching to using the microservice database as the master copy occurs after all data needs are verified.

18. The computer-readable storage medium of claim 15, wherein switching to using the microservice database as the master copy occurs in segments such that data controlled by a service of the microservice database is the master copy after the service has been verified.

19. The computer-readable storage medium of claim 15, wherein the instructions further configure the computer to generate an alert and remediate a data failure when there is a discrepancy between the Pick database and the microservice database.

20. The computer-readable storage medium of claim 15, wherein the instructions further configure the computer to verify the microservice database, wherein verification occurs after a target period of time with no discrepancies between the Pick database and the microservice database.

* * * * *